United States Patent [19]

Kadomukai et al.

[11] Patent Number: 5,186,136
[45] Date of Patent: Feb. 16, 1993

[54] ABNORMAL COMBUSTION DETECTION AND VIBRATION REDUCTION SYSTEM

[75] Inventors: Yuzo Kadomukai; Makoto Yamakado, both of Ibaraki; Yuji Maeda, Hitachiota; Kenichi Nakamura, Katsuta; Masao Fukushima, Machida; Kei Murakami, Zama, all of Japan

[73] Assignees: Hitachi, Ltd., Tokyo; Nissan Motor Co., Ltd., Yokohama, both of Japan

[21] Appl. No.: 747,146

[22] Filed: Aug. 19, 1991

[30] Foreign Application Priority Data

Aug. 28, 1990 [JP] Japan .................................. 2-226388

[51] Int. Cl.⁵ ............................................. F02B 75/06
[52] U.S. Cl. ............................................. 123/192.1
[58] Field of Search .................. 123/2, 192.1, 192.2, 123/1 R; 73/116; 290/51

[56] References Cited

U.S. PATENT DOCUMENTS

| | | | |
|---|---|---|---|
| 4,509,484 | 4/1985 | Gertiser | 73/116 |
| 5,033,425 | 7/1991 | Kadomukai et al. | 123/2 |
| 5,041,980 | 8/1991 | Maddock et al. | 73/116 |
| 5,056,360 | 10/1991 | Dosdall et al. | 73/116 |

Primary Examiner—Noah P. Kamen
Attorney, Agent, or Firm—Antonelli, Terry, Stout & Kraus

[57] ABSTRACT

An apparatus and a method for detecting abnormal combustion in an internal combustion engine and an apparatus and a method for controlling vibration caused by abnormal combustion. The apparatus for detecting abnormal combustion includes a unit for detecting the rotation of an internal combustion engine, a unit for calculating rotation angular acceleration on the basis of the detected rotation, a unit for comparing the rotation angular acceleration at the position of a predetermined crank angle in one cycle of the operation of the internal combustion engine with a predetermined reference value, and a unit for judging from the comparison result whether abnormal combustion occurs in the internal combustion engine. The apparatus for reducing vibration caused by abnormal combustion offsets vibration caused by abnormal combustion and vibration of an electric generator to each other by passing a pulse-like field current in the electric generator in response to detection of abnormal combustion to generate vibration torque in the electric generator.

37 Claims, 15 Drawing Sheets

F I G. 10
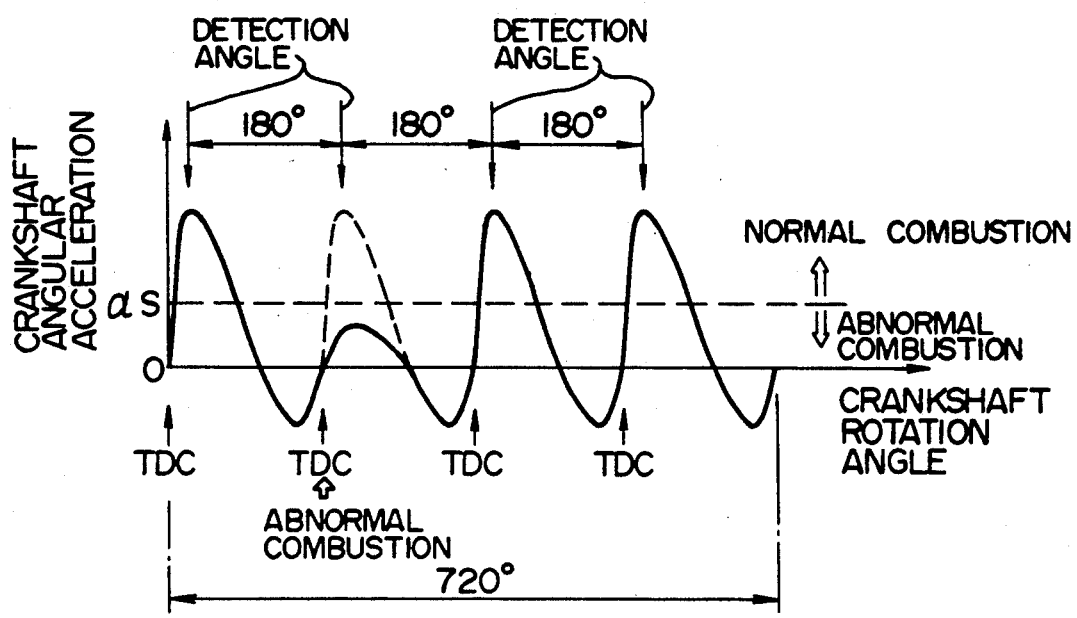
F I G. 12
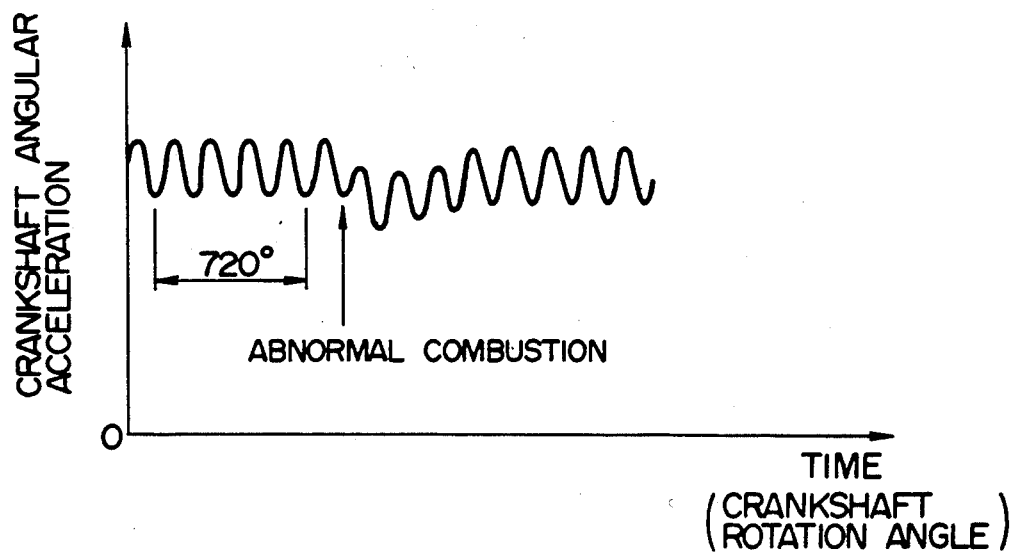

F I G. 17
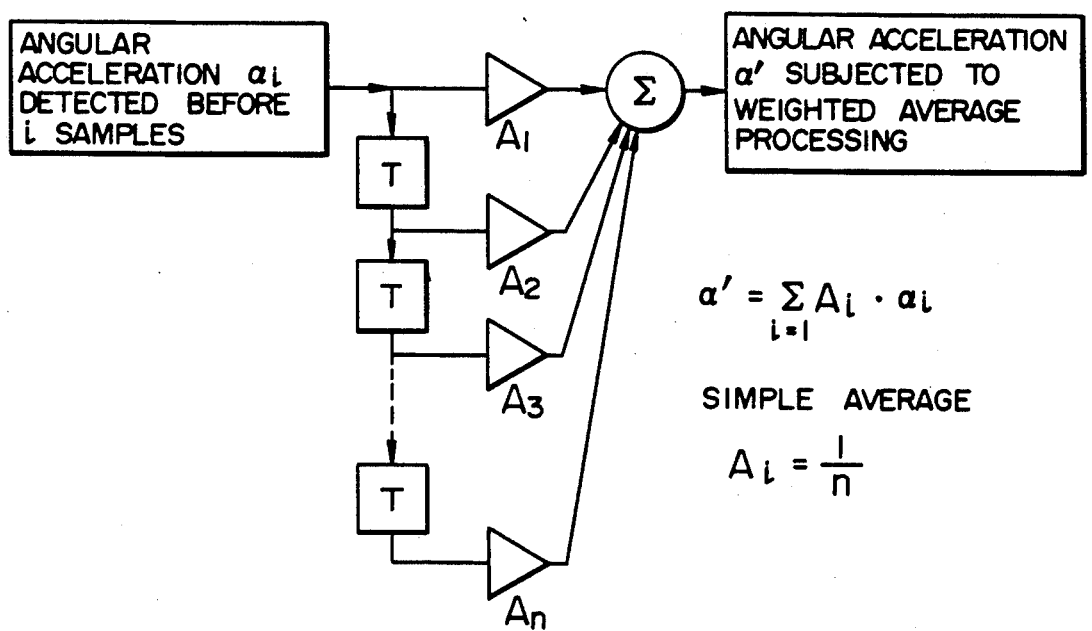

ABNORMAL COMBUSTION DETECTION AND VIBRATION REDUCTION SYSTEM

BACKGROUND OF THE INVENTION

The present invention relates to an abnormal combustion detecting apparatus and method for detecting occurrence of abnormal combustion in an internal combustion engine, and also relates to a control apparatus and method using the abnormal combustion detecting apparatus and method for reducing vibration caused by abnormal combustion in the internal combustion engine.

In recent years, there is a tendency to employ mechanism of double over head camshafts in internal combustion engines to realize high-speed rotation and high output power. This type internal combustion engines are designed to exhibit high efficiency in operation at high speed. For example, the cam profile is designed so that the timing of opening/closing of intake and exhaust valves is designed to adapt to high-speed operation. Therefore, such abnormal combustion that the combustion pressure of some cylinder is reduced as compared with the pressure of normal combustion cylinder because of misfire, uneven combustion in cylinders, or the like, often occurs at the time of low-speed rotation such as at idling.

In general, a periodic torque fluctuation synchronous with the frequency of combustion strokes in each cylinder as shown in FIG. 2 (which shows the case where a four-cycle four-cylinder engine is used) is generated in a crankshaft of an internal combustion engine when the internal combustion engine is operated. The cyclic torque fluctuation causes torsional vibration in rotation shafts such as a crankshaft in the engine or in various kinds of apparatus driven by the engine. In an automobile engine, the reaction of the cyclic torque fluctuation may be transmitted from engine mounts to an automobile body to vibrate the body of automobile as a whole, so that vibration or inside noise may occur.

Assuming now that abnormal combustion as shown in FIG. 3 occurs in some cylinder, then output torque drops down remarkably in an instant compared with the output torque at the state of normal combustion. The reaction of the torque reduced by the abnormal combustion acts as vibration torque for vibrating the internal combustion engine itself and the automobile body in the same manner as the reaction of the cyclic torque fluctuation synchronous with the combustion frequency. Because the dropping (difference between the broken line and the solid line shown in FIG. 3) of torque caused by abnormal combustion occurs only in the cylinder of abnormal combustion, the envelope thereof is shaped like a single-shot pulse Accordingly, vibration torque as the reaction of the dropping of torque gives vibration to the engine and the automobile in the form of a single-shot pulse as shown in FIG. 4. At this time, a vibration having the combustion frequency generated in the engine and a vibration having the natural frequency of each of the internal combustion engine and the automobile are combined with each other in each of the engine and the automobile. Among these vibrations, the vibration having the natural frequency of each of the engine and the automobile is caused by single-shot pulse vibration torque as the reaction of the dropping of torque caused by abnormal combustion, so that the vibration exhibits the form of transitional vibration, so called, in which the vibration is attenuated with the passage of time.

In the case where an engine is set in a longitudinal direction with respect to an automobile as seen in an FR (front-engine rear-drive) car, that is, in the case where the axial direction of a crankshaft of an engine is equal to the direction of a roll axis of an automobile, the aforementioned reaction of the dropping of torque caused by abnormal combustion acts as vibration torque which brings the rolling of the engine and the rolling of the automobile. In general, the natural frequency of rolling in each of the engine body and the automobile is about 5 to about 10 Hz. At the time of low-speed rotation such as the time of the idling of the engine, however, the frequency in which abnormal combustion occurs is in the aforementioned natural frequency range of the rolling. If abnormal combustion occurs at the time of low-speed rotation, both the engine and the automobile are rolled so that an unpleasant feeling may be given to passengers. It is therefore necessary to reduce vibration of the engine and the automobile caused by abnormal combustion in the engine.

As one example of a technique for controlling vibration torque generated by the internal combustion engine, reference is made to Japanese Patent Unexamined Publication No. JP-A-61-171612 of Japanese Patent Application filed Jan. 28, 1985 by TOYOTA MOTOR CO., LTD. According to the disclosed technique, the torque fluctuation is reduced by generating reverse torque in the crank-shaft synchronously with the increasing of torque in the torque fluctuation generated with the frequency of combustion by the engine.

However, the aforementioned disclosed technique can cope only with the periodical torque fluctuation generated in the crankshaft synchronously with combustion in the engine. Accordingly, the disclosed technique cannot be applied to the vibration problem caused by the irregular torque fluctuation such as the torque dropping caused by abnormal combustion which occurs irregularly.

Further, in the aforementioned disclosed technique, the torque fluctuation generated by the engine is detected on the basis of the rolling acceleration of the engine detected by an acceleration pickup provided in the engine body. In the disclosed technique, such an acceleration pickup which is not provided originally in the engine must be provided newly.

SUMMARY OF THE INVENTION

An object of the present invention is to provide an apparatus and a method for detecting abnormal combustion in an internal combustion engine, in which abnormal; combustion in the internal combustion engine can be detected without necessity of provision of an expensive sensor or the like and by which the aforementioned problems can be solved.

Another object of the present invention is to provide a vibration control apparatus using the abnormal combustion detecting apparatus, for reducing vibration caused by the torque fluctuation due to abnormal combustion in the internal combustion engine.

The theory of detection of abnormal combustion in the engine according to the present invention is as follows. Abnormal combustion in the engine is detected by means for detecting angular acceleration of a rotation shaft of the engine and device for judging from the detected value of angular acceleration whether abnormal combustion occurs in the engine.

Further, the theory of the controlling of vibration of the internal combustion engine according to the present invention is as follows. The apparatus according to the present invention has an electric generator fixed to the engine body, a field excitation circuit for controlling a field current in the electric generator, and an apparatus for detecting abnormal combustion in the engine. The field excitation circuit passes a single-shot pulse field current in the electric generator correspondingly to the detection of abnormal combustion in the engine to generate vibration in the electric generator itself to thereby offset vibration of the engine caused by abnormal combustion in the engine and, accordingly, offset vibration of an automobile including the engine.

According to the present invention, not only abnormal combustion in the engine can be exactly detected on the basis of the angular acceleration of the rotation shaft of the engine, but both vibration of the engine caused by the torque fluctuation due to abnormal combustion in the engine and vibration of the automobile body including the engine can be canceled or reduced by reverse-phase vibration generated by the reaction of rotation torque in the stator of electric generator.

BRIEF DESCRIPTION OF THE DRAWINGS

FIG. 10 is a waveform graph for facilitating the understanding of FIG. 9;

FIG. 12 is a graph showing an example of changes of the crankshaft angular velocity upon occurrence of abnormal combustion;

FIG. 17 is a diagram of a non-recursive digital filter for performing the averaging;

DESCRIPTION OF THE PREFERRED EMBODIMENTS

Figure 1:
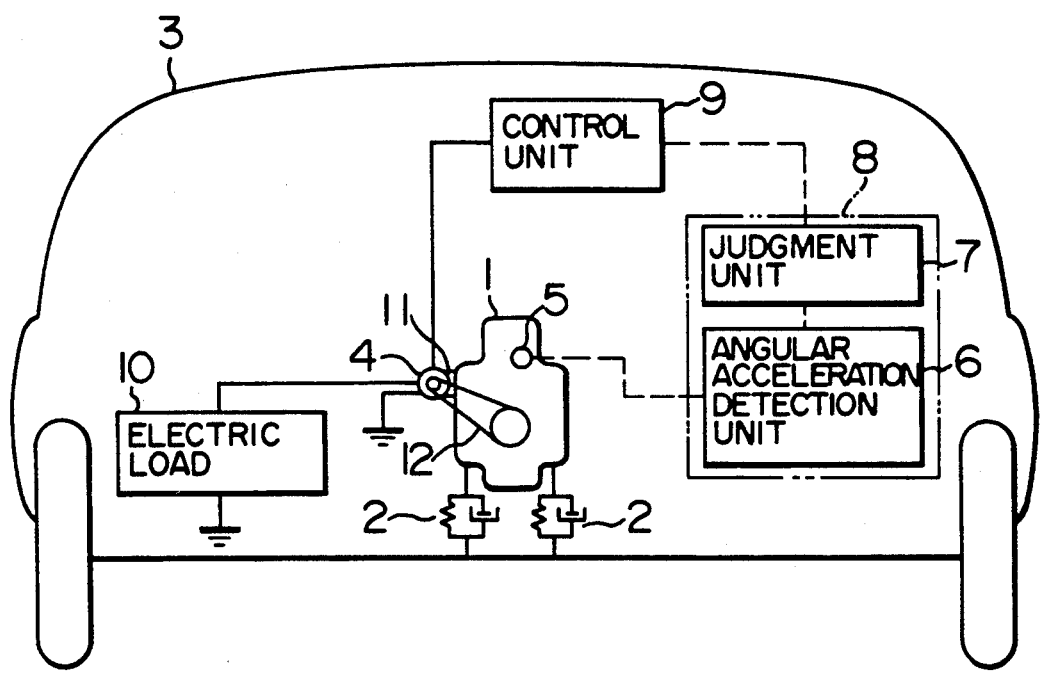
FIG. 1 is a diagram showing the outline of an embodiment of the present invention.

The outline of an embodiment of the present invention is shown in FIG. 1.

In this embodiment, the present invention is applied to an automobile internal combustion engine. In FIG. 1, the internal combustion engine 1 is supported by engine mounts 2 on a chassis of automobile 3. The internal combustion engine 1 is set so that the axial direction of a crankshaft of the engine 1 is equal to the direction of a roll axis of the automobile 3, or in other words, the engine 1 is set longitudinally. If abnormal combustion occurs under the condition of the setting thereof, vibration torque due to abnormal combustion brings the rolling of the engine 1 and, accordingly, brings the rolling of the automobile 3 as a whole. In general, the natural frequency of rolling of the automobile 3 (which is determined by the roll inertia of the automobile 3 and the spring coefficients of suspensions, tires, etc.) is about 5 to about 10 Hz. At the time of low-speed rotation such as the time of the idling of the internal combustion engine 1, however, the frequency in which abnormal combustion occurs is in the aforementioned natural frequency range of the rolling. If abnormal combustion occurs at the running with low-speed rotation, both the engine 1 and the automobile 3 as a whole are rolled so greatly that passengers may feel vibration.

An electric generator 4 and a crank angle sensor 5 for outputting the rotation angle of a crankshaft, which is a rotation shaft of the internal combustion engine 1, as a rotation angle pulse are attached to the internal combustion engine 1. In general, the crank angle sensor 5 is incorporated in a cam shaft or in a distributor. FIG. 1 shows the case where it is incorporated in a cam shaft.

An abnormal combustion detection portion 8 according to the present invention is composed of a crank angle sensor 5, an angular acceleration detection portion 6 for detecting angular acceleration by using the rotation angle pulse of the crankshaft outputted from the crank angle sensor 5, and a judgment portion 7 for judging, from the value of angular acceleration detected by the angular acceleration detection portion 6, whether abnormal combustion occurs in the internal combustion engine. Further, a vibration controller according to the present invention includes an abnormal combustion detection portion 8 as defined above, and a control portion 9 for controlling the magnitude of a field current in an electric generator 4 when abnormal combustion in the internal combustion engine 1 is detected. Further, the automobile 3 has an electric load 10 which consumes electric energy supplied by the electric generator 4.

A body of the electric generator 4 is fast fixed to the engine 1 by means of a bracket 11. A rotor of the electric generator 4 is driven by the engine 1 through a belt 12. When the field current in the electric generator 4 changes rapidly, the rotation load of the rotor as seen from the engine side changes greatly. The load change serves as a reaction in the stator side of the electric generator 4. In short, the change of the field current brings vibration torque in the body of the electric generator 4. Because the vibration torque acts on the rotation axis of the rotor, the direction of the vibration torque coincides with the direction of the rolling of the engine. The magnitude of the vibration torque in the electric generator 4 is proportional to the change of the field current. Because the electric generator 4 is fixed to the engine 1 with the bracket 11, the vibration torque in the electric generator 4 is transmitted to the engine body 1 through the bracket 11. That is, not only rotation torque acting on the crankshaft of the engine 1 but vibration bringing the rolling of the engine body can be controlled by controlling the field current in the electric generator 4.

The crank angle sensor 5 generates two kinds of rotation angle pulses, namely, a TDC (top dead center) pulse for detecting the top dead center position of each cylinder and a divided pulse for detecting the rotation of the crankshaft at the equal interval of a fine angle, synchronously with the rotation of the crankshaft.

The angular acceleration detection portion 76 in the abnormal combustion detection portion 8 detects the rotation angle of the crankshaft by using the TDC pulse and the divided pulse, and, at the same time, detects angular acceleration for each rotation angle of the crankshaft by using the divided pulse.

That is, the divided pulse is generated whenever the crankshaft rotates by a fine equal angle. Accordingly, the position of the rotation angle of the crankshaft can be detected by counting the number of divided pulses outputted after the generation of the TDC pulse, with the TDC pulse as a reference. The angular acceleration of the crankshaft is detected by the following two methods.

Figure 2:
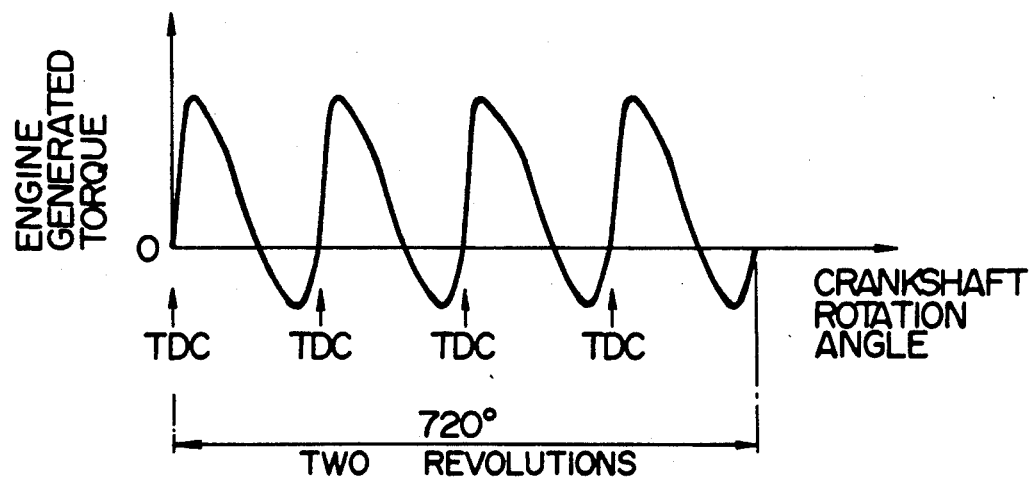
FIG. 2 is a graph showing an example of break torque generated by the internal combustion engine.
Figure 5:
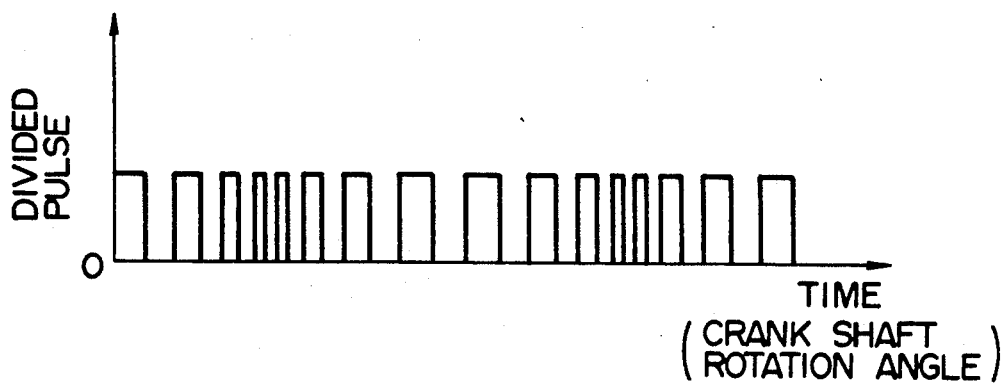
FIG. 5 is a graph showing an example of a divided pulse train outputted from a crank angle sensor.

One is a method for detecting the angular acceleration of the crankshaft by calculating angular acceleration of the crankshaft on the basis of the reciprocal of the generation period of the divided pulses and then differentiating the angular acceleration with respect to time or calculating the difference in the angular acceleration with respect to time. FIG. 5 is a graph showing an example of a divided pulse train outputted from the crank angle sensor 5. As shown in FIG. 2, torque generated by the engine changes synchronously with the combustion stroke of each cylinder. Accordingly, the angular acceleration of the crankshaft at the interval of an instant also changes, so that the divided pulses of the crank angle sensor 5 are outputted in the form of a signal subjected to frequency modulation (and, at the same time, subjected to width modulation which is not utilized). Assuming now that a divided pulse is outputted whenever the crank angle rotates by $\Delta\theta$, then the angular velocity $\omega$ of the crankshaft can be calculated as $\omega = \Delta74/T$ on the basis of the reciprocal of the generation period T of the divided pulses. Further, the angular acceleration $\alpha$ of the crankshaft can be calculated as $\alpha = d\omega/DT = (\omega_2 - \omega_1)/(T_1+T_2)/2$ on the basis the change of the angular velocity, because the angular acceleration $\alpha$ is obtained by differentiating the angular velocity with respect to time or by calculating the difference of the angular velocity with respect to time. In the case where the rotation velocity (the average of the angular velocity of the crankshaft) of the engine 1 is regarded as constant, the angular acceleration $\alpha$ can be replaced by the different $\omega_2 - \omega_1$ of the angular velocity to simply perform the detection of abnormal combustion and the control of torque which will be described later, because the angular acceleration $\alpha$ is substantially proportional to the difference $\omega_2 - \omega_1$ of the angular velocity.

Figure 6:
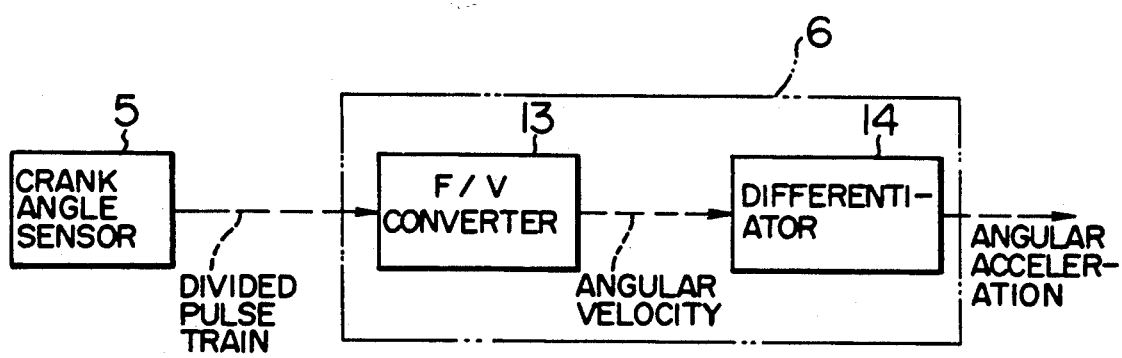
FIG. 6 is a diagram showing an example of construction of an abnormal combustion detection portion.

As the other method, the angular acceleration detection portion 6 is composed of a frequency/voltage converter (F/V converter) 13 and a differentiator 14 as shown in FIG. 6. The F/V converter 13 converts the frequency of the divided pulse train outputted from the crank angle sensor 5, that is, the angular velocity of the crankshaft, into a voltage. The differentiator 14 outputs a voltage signal obtained by differentiating a voltage signal expressing angular velocity outputted from the F/V converter 13 with respect to time, that is, the differentiator 14 outputs a voltage signal expressing angular acceleration.

The angular acceleration of the crankshaft can be detected by using any one of the aforementioned methods.

On the other hand, the judgment portion 7 in the abnormal combustion detection portion 8 detects abnormal combustion on the basis of the value of angular acceleration detected by the angular acceleration detection portion 6 according to any one of the aforementioned methods. A method for detecting abnormal combustion will be described in detail hereunder.

Figure 7:
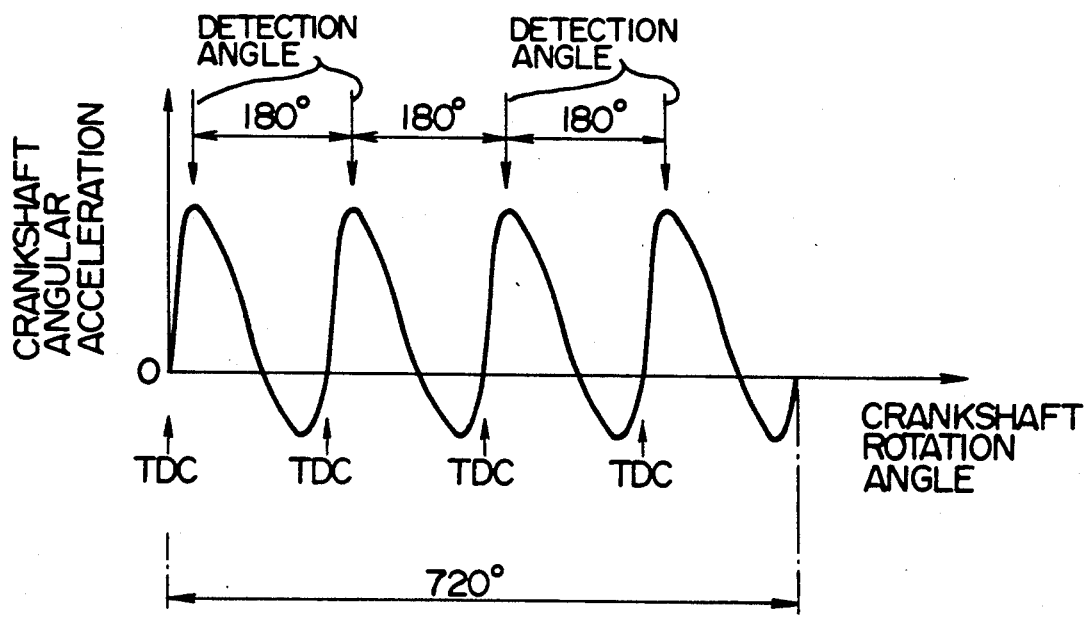
FIG. 7 is a graph showing an example of angular acceleration of a crankshaft in the case of normal combustion.

FIG. 7 is a graph showing an example of angular acceleration of the crankshaft of the internal combustion engine 1 in the case where there is no abnormal combustion. Because the angular acceleration of the crankshaft is obtained by dividing torque around the crankshaft as shown in FIG. 2 by the rotational inertia of the crankshaft, the waveform of the angular acceleration of the crankshaft is substantially similar to the waveform of torque. One combustion cycle of a four-cycle engine includes four different strokes, namely, compression, combustion, exhaustion and intake which requires two crankshaft revolutions, a total of 720 degrees of the rotation angle of the crankshaft. When, for example, the internal combustion engine 1 is a four-cycle engine, combustion occurs four times in the rotation angle of the crankshaft of 720 degrees and, accordingly, substantially equal values of angular acceleration appear at equal angular intervals of 720 degrees/4=180 degrees. Accordingly, in the case where the engine 1 is a four-cycle engine, substantially equal values of angular acceleration for the respective cylinders can be detected by detecting angular acceleration for the rotation angle (hereinafter called "detection angle") of the crankshaft at intervals of an angle obtained by dividing 720° by the number n (positive integer) of cylinders (or at intervals of an angle obtained by dividing 360° by the number of cylinders in the case where the internal combustion engine 1 is a two-cycle engine).

Figure 8:
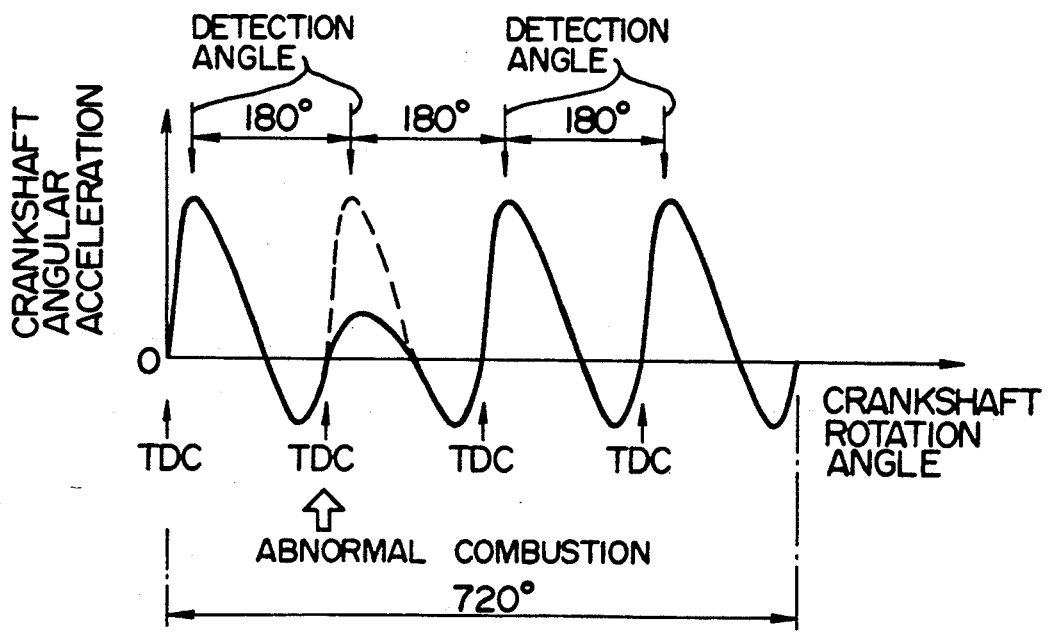
FIG. 8 is a graph showing angular acceleration of the crankshaft in the case where abnormal combustion occurs in one cylinder.

FIG. 8 is a graph showing the angular acceleration of the crankshaft of the engine 1 in the case where abnormal combustion occurs in one cylinder, in which the waveform of angular acceleration as shown in FIG. 7 in the case of normal combustion is additionally shown in the broken line. As is obvious from the graph that the angular acceleration of the cylinder in which abnormal combustion occurs in smaller than the angular acceleration of the other cylinders in which normal combustion occurs, if values of angular acceleration are detected at detection angle intervals of 180°. Accordingly, abnormal combustion in the engine 1 can be detected by comparing the values of angular acceleration of the crankshaft detected at intervals of 180°.

Figure 9:
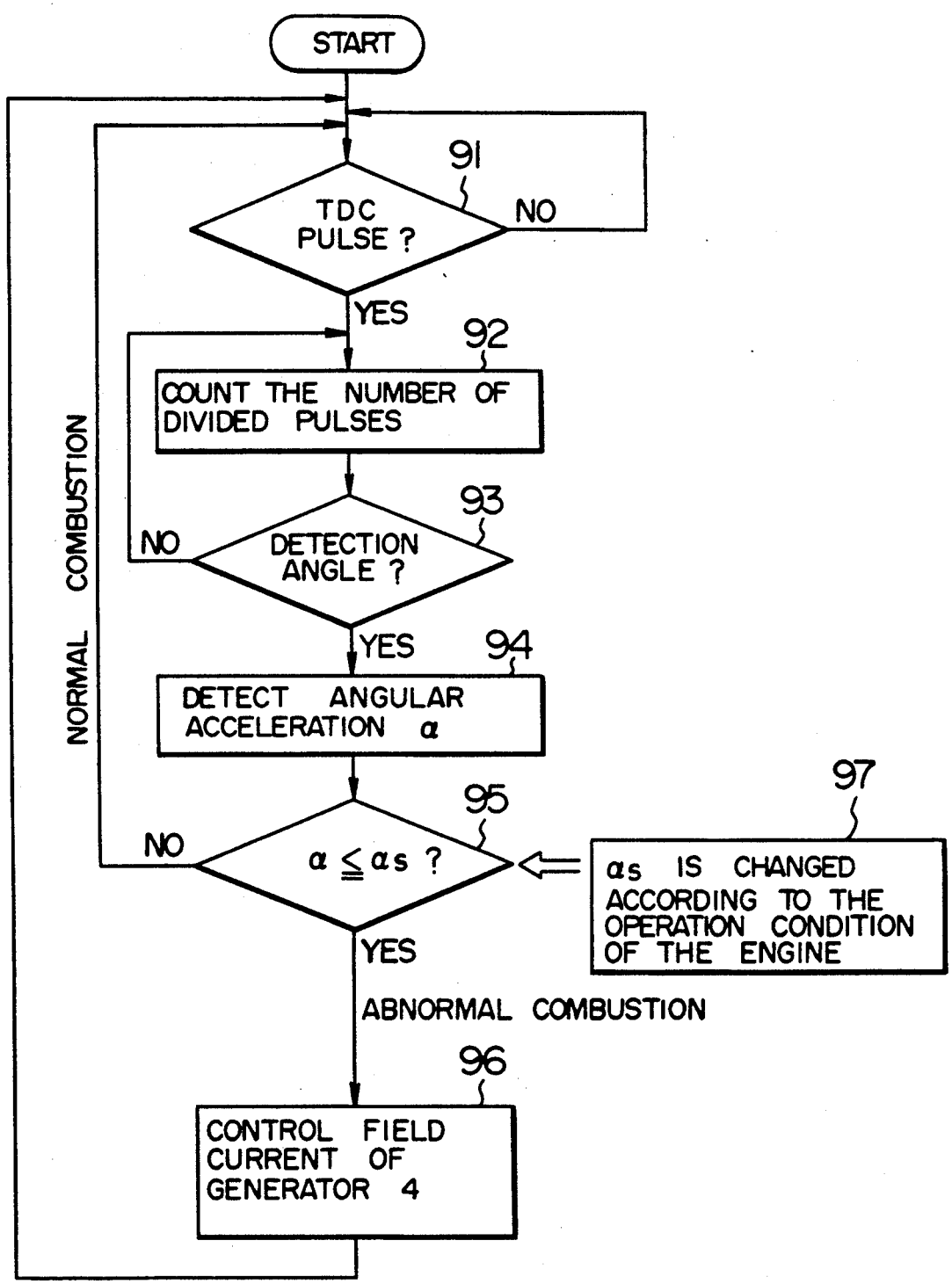
FIG. 9 is a flow chart showing an abnormal combustion detecting logic.

FIG. 9 is a flow chart showing an abnormal combustion detecting logic in the judgment portion 7. The detecting logic shown in FIG. 9 is as follows. A value $\alpha s$ of angular acceleration as a threshold is preliminarily determined on the basis of the angular acceleration of the crankshaft generated at a detection angle in the case of normal combustion (see FIG. 10). When the value $\alpha$ of angular acceleration detected in the angular acceleration detection portion 6 is larger than the threshold $\alpha s$, a decision is made that the combustion is normal and then the situation of the procedure goes to the step of detecting angular acceleration at the next detection angle. When, on the contrary, the detected value $\alpha$ of angular acceleration is smaller than the threshold $\alpha s$, a decision is made that the combustion is abnormal and then the situation of the procedure goes to the step of controlling the field current in the electric generator 4.

In the following, the flow chart of FIG. 9 is explained. The abnormal combustion detection portion 8 can be realized by a known microcomputer or another equivalent signal processor. In the step 91, the crank angle sensor 5 judges whether the TDC pulse has been generated. When the TDC pulse has been generated, divided pulses from the crank angle sensor 5 are counted in the step 92. In the step 93, a judgment is made as to whether the count value of the divided pulses coincides with the predetermined angular acceleration detection position (crank angle). When the count value coincides with the predetermined angular acceleration detection position, in the step 94, the angular acceleration $\alpha$ of the crankshaft is calculated on the basis of the divided pulses by the aforementioned method. In the step 95, the calculated angular acceleration $\alpha$ is compared with a threshold $\alpha s$ which is set in advance. When the angular acceleration $\alpha$ is smaller than the threshold $\alpha s$, a decision is made that abnormal combustion occurs because generation torque is reduced. When abnormal combustion is detected, the field current in the electric generator 4 is controlled in the step 96 to thereby suppress vibration. The field current control in the step 96 will be described in detail later.

In the case where fine detection is required with respect to the degree of abnormal combustion, a detecting logic 97 in which the size of the threshold is changed correspondingly to the operating condition of the internal combustion engine 1 such as the load imposed on the internal combustion engine 1, the engine speed, the coolant temperature, etc. may be added.

Figure 11:
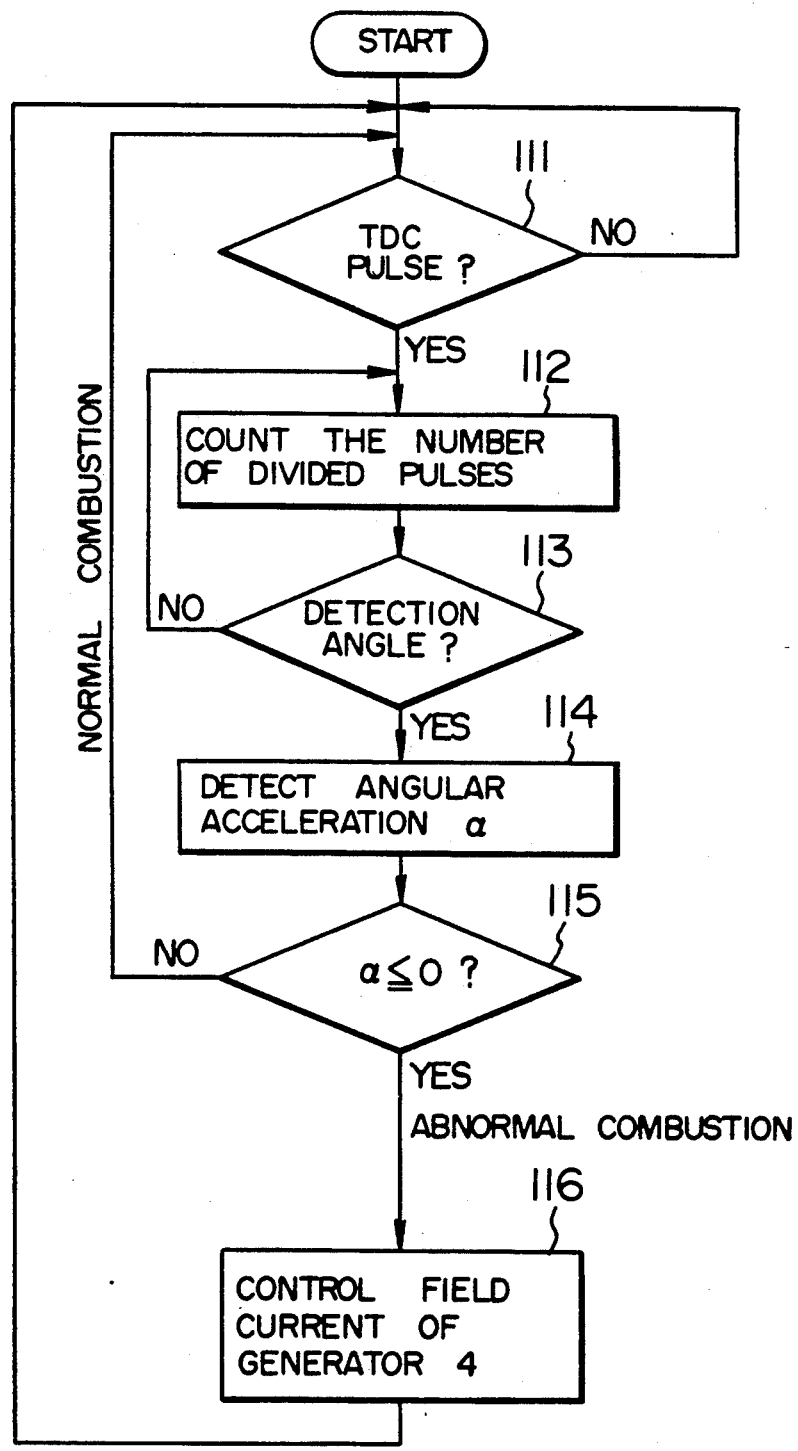
FIG. 11 is a flow chart showing an abnormal combustion detecting logic in the case where a threshold for judgment of abnormal combustion is set to zero.

In general, each cylinder in the internal combustion engine is ignited just before the top dead center of each cylinder. Accordingly, the value of angular acceleration of the crankshaft at the rotation angle of the crankshaft corresponding to the top dead center is positive as shown in FIG. 7 if combustion is normal. When abnormal combustion occurs, however, the value of angular acceleration of the crankshaft at the rotation angle of the crankshaft corresponding to the top dad center is negative as shown in FIG. 8 because angular acceleration cannot increase even if the rotation angle of the crankshaft exceeds the top dead center. That is, if the angle for detection of angular acceleration is set to be equal to the rotation angle of the crankshaft corresponding to the top dead center of each cylinder, the threshold $\alpha s$ in the detecting logic can be set to zero as shown in FIG. 11. That is, the comparison between the detected angular acceleration $\alpha$ and the threshold $\alpha s$ can be made easily by seeing the sign of the detected angular acceleration $\alpha$. Because there is no necessity of comparing the angular acceleration with the threshold $\alpha s$, the complication of software or logic circuit for realizing the detecting logic can be avoided.

A flow chart in an embodiment in which the threshold $\alpha s$ is set to zero in the case where the abnormal combustion detection portion 8 is realized by a microcomputer will be now described with reference to FIG. 11.

In the step 111, a judgment is made as to whether the crank angle sensor 5 has generated a TDC pulse. When the TDC pulse is generated, divided pulses from the crank angle sensor 5 are counted in the step 112. In the step 113, a judgment is made as to whether the count value of the divided pulses coincides with the predetermined TDC position. When the count value coincides with the TDC position, in the step 114, the angular acceleration $\alpha$ of the crankshaft is calculated on the basis of the divided pulses by the aforementioned method. In the step 115, a judgment is made as to whether the calculated angular acceleration $\alpha$ is positive or negative. When the angular acceleration $\alpha$ at the TDC position is zero or negative, a decision is made that abnormal combustion occurs because generation torque is reduced. When abnormal combustion is detected, the field current in the electric generator 4 is controlled in the step 116 to thereby suppress vibration. The field current control in the step 116 will be described in detail later.

Figure 3:
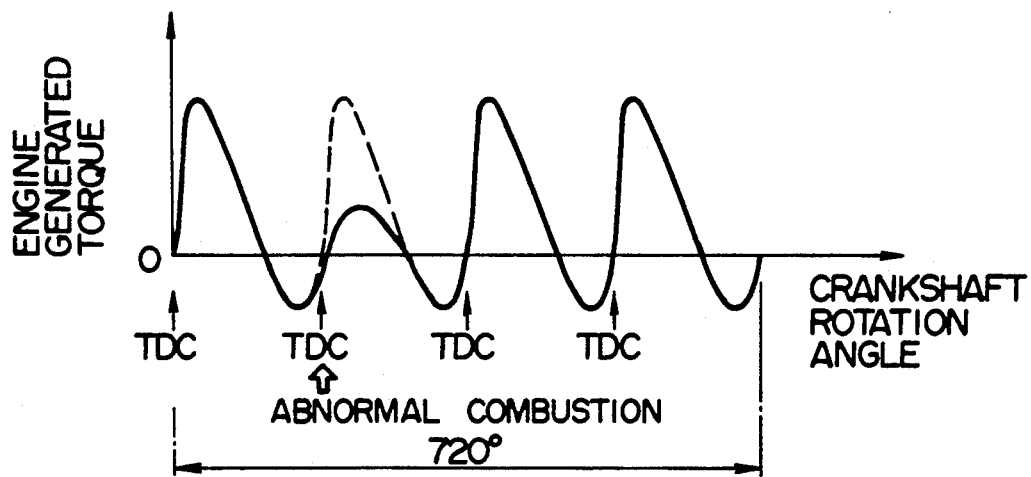
FIG. 3 is a graph showing an example of break torque generated by the internal combustion engine in the case where abnormal combustion occurs.
Figure 4:
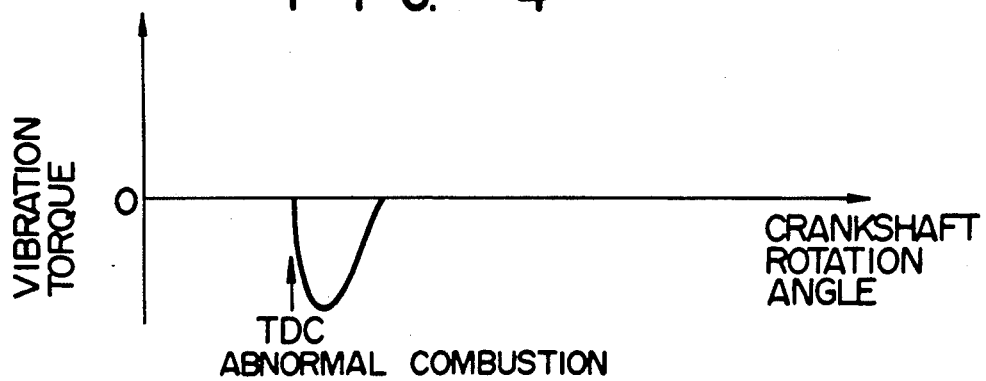
FIG. 4 is a graph showing vibration torque acting on the internal combustion engine due to abnormal combustion.

As is obvious from FIGS. 2 and 3, the positive portion of break torque substantially rises from the top dead center. Accordingly, vibration torque vibrating the internal combustion engine 1 in the rotational direction as the reaction of the torque dropping at the time of abnormal combustion also substantially rises from the top dead center as shown in FIG. 4. Accordingly, not only abnormal combustion but the point of time of generation of vibration torque can be detected simultaneously if abnormal combustion is detected by detecting the top dead center on the basis of the TDC pulse outputted from the crank angle sensor 5 and detecting angular acceleration on the basis of the divided pulse.

The reason why the parameter used in the present invention for the purpose of judging abnormal combustion is not angular velocity but angular acceleration of the crankshaft is as follows.

FIG. 12 is a graph showing an example of the change of angular velocity of the crankshaft in the case where abnormal combustion occurs. As is obvious from the graph, angular velocity is temporarily reduced with the torque dropping when abnormal combustion occurs. Accordingly, it may be considered that abnormal combustion can be judged from the degree of the dropping of angular velocity through detecting angular velocity at the detection angle of each cylinder in the internal combustion engine 1 in the same manner as in the case of detection of angular acceleration. This method of detecting abnormal combustion by using the change of angular velocity can be directly applied to the case where the load imposed on the engine 1 is constant or changes slowly. In the case where the load imposed on the engine 1 changes rapidly, for example, at the time of the starting of an air conditioner or at the time of the rapidly steering of a power steering wheel, however, the load imposed on the internal combustion engine 1 increases so rapidly that angular velocity decreases even if there is no occurrence of abnormal combustion. That is, if the method of judging abnormal combustion from the degree of the dropping of angular velocity is employed, the change of the load imposed on the internal combustion engine 1 may be misjudged as abnormal combustion.

On the contrary, in the method of judging abnormal combustion by using angular acceleration, torque generated by the engine 1 is directly detected by measuring angular acceleration. Because frequency in the change of angular acceleration of the power shaft caused by the load change is very low compared with the change of angular acceleration caused by abnormal combustion, the tow can be clearly discriminated from each other. Accordingly, the change of angular velocity caused by the rapid change of the load is never misjudged as abnormal combustion, because normal combustion can be judged from the value of angular acceleration if the combustion in the engine 1 is normal.

The method for detecting abnormal combustion in the engine according to the present invention is a method in which the detection of abnormal combustion is not influenced by the disturbance such as the load imposed on the engine.

Figure 13:
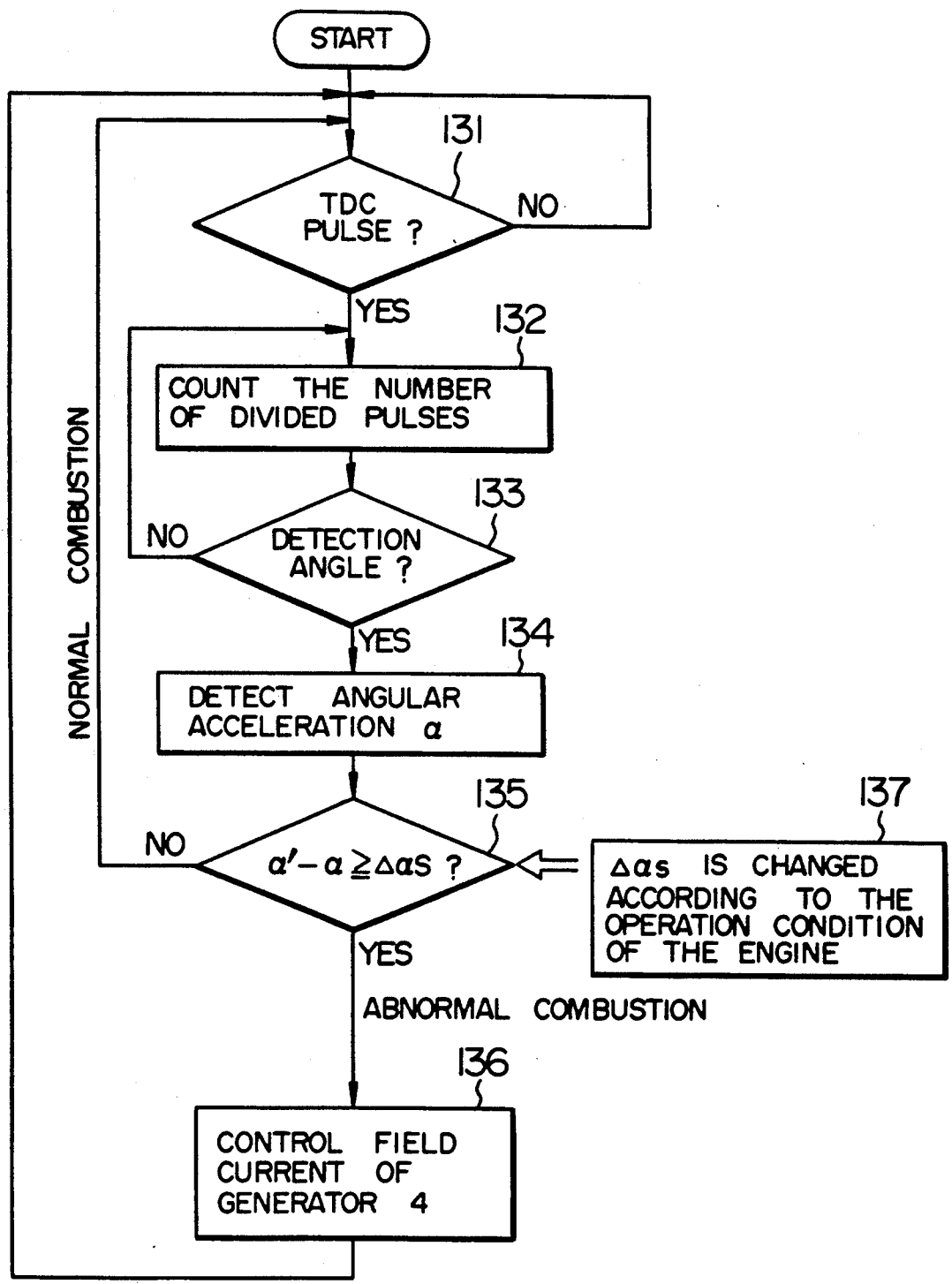
FIG. 13 is a flow chart showing another abnormal combustion detecting logic.

FIG. 13 is a flow chart showing an abnormal combustion detecting logic in the judgment portion 7 as another embodiment different from the embodiment of FIG. 9. The abnormal combustion detecting logic shown in FIG. 13 is as follows. The present value $\alpha$ of angular acceleration is compared with the previous value $\alpha'$; of angular acceleration at the prior detection angle. When the difference $\alpha' - \alpha$ between the two values (the dropping of angular acceleration) is smaller than a threshold $\Delta\alpha s$ (positive numerical number) set in advance, a decision is made that the combustion is normal and then the situation of the procedure goes to the step of detecting angular acceleration at the next detection angle. When, on the contrary, the angular acceleration dropping $\alpha' - \alpha$ is larger than the threshold $\Delta\alpha s$, a decision is made that the combustion is abnormal and then the situation of the procedure goes to the step of controlling torque in the internal combustion engine 1.

Figure 14:
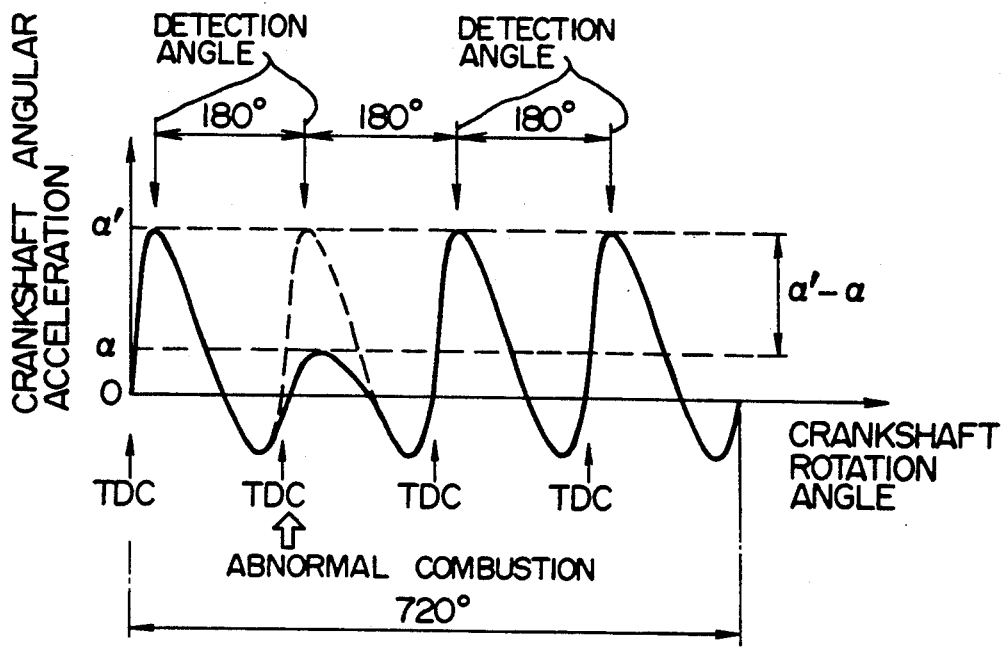
FIG. 14 is a waveform graph for facilitating the understanding of FIG. 13.

FIG. 14 shows the difference $(\alpha' - \alpha)$ of angular acceleration at the time of the occurrence of abnormal combustion.

In the following, the flow chart shown in FIG. 13 is explained. In the step 131, a judgment is made as to whether the crank angle sensor 5 has generated a TDC pulse. When the TDC pulse is generated, divided pulses from the crank angle sensor 5 are counted in the step 132. In the step 133, a judgment is made as to whether the count value of the divided pulses coincides with the predetermined angular acceleration detection position (crank angle). When the count value coincides with the predetermined angular acceleration detection position, in the step 134, the angular acceleration $\alpha$ of the crankshaft is calculated on the basis of the divided pulses by the aforementioned method. In the step 135, the difference between angular acceleration $\alpha'$ calculated at the previous detection time and stored in a memory and angular acceleration $\alpha$ calculated at the present detection time is calculated and is compared with the difference threshold $\Delta\alpha s$ set in advance. When the angular acceleration difference $(\alpha' - \alpha)$ is larger than the difference threshold $\Delta\alpha s$, a decision is made that abnormal combustion occurs because generated torque is reduced. When abnormal combustion is detected, in the step 136, the field current in the electric generator 4 is controlled to thereby suppress vibration. The field current control in the step 136 will be described in detail later.

In the case where more exact detection is required with respect to the degree of abnormal combustion, a detecting logic 137 in which the size of the threshold $\Delta\alpha s$ is changed correspondingly to the operating condition of the engine 1 such as load imposed on the engine 1, engine speed, coolant temperature, etc. may be added.

Figure 15:
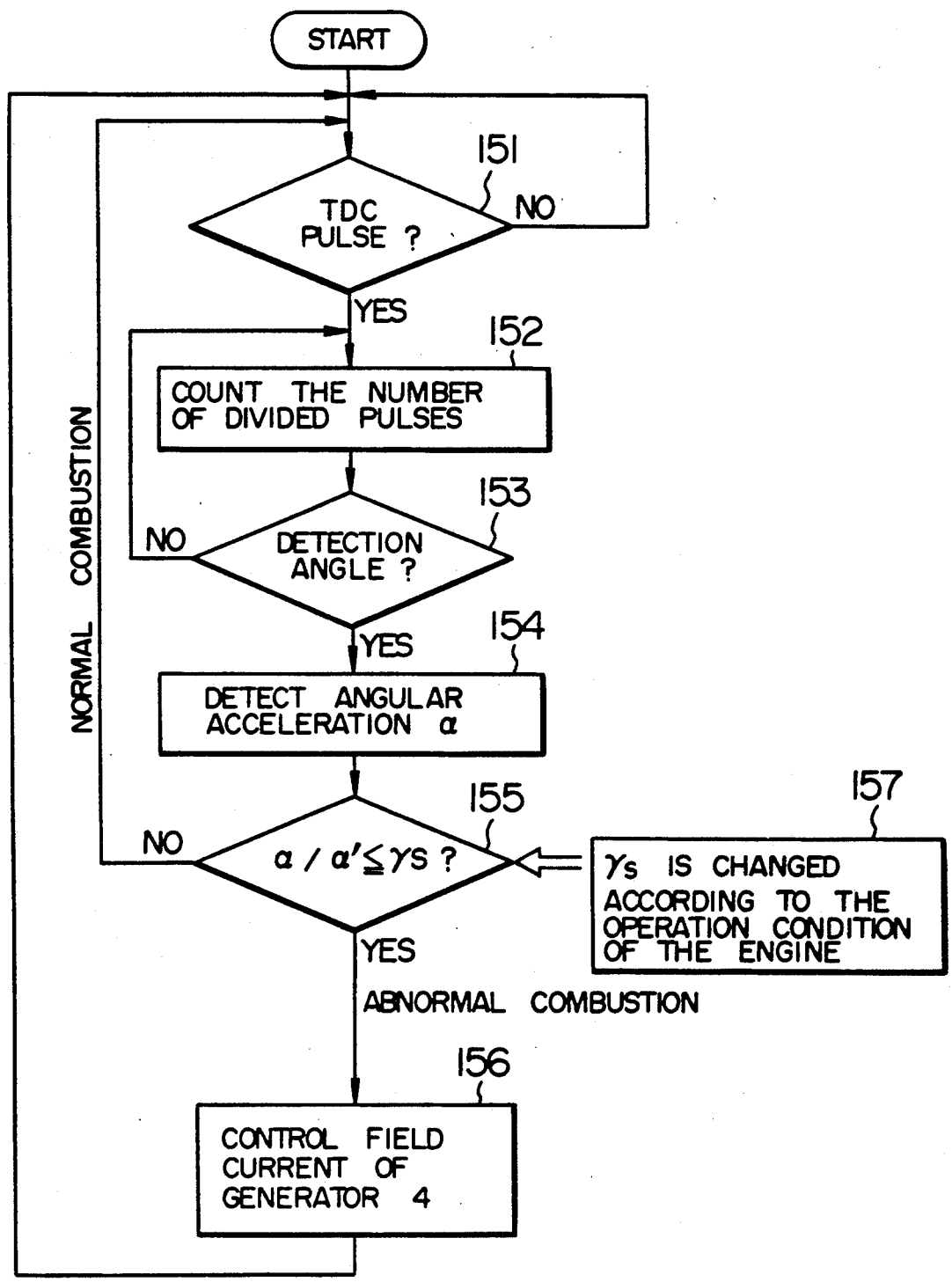
FIG. 15 is a flow chart showing a further abnormal combustion detecting logic.

FIG. 15 is a flow chart showing an abnormal combustion detecting logic in the judgment portion 7 as a third embodiment different from the embodiments of FIGS. 9 and 13. The abnormal combustion detecting logic shown in FIG. 15 is as follows. The present value $\alpha$ of angular acceleration is compared with the previous value $\alpha'$ of angular acceleration measured at the previous detection angle and stored in a memory. When the ratio $\alpha/\alpha'$ of the two values larger than a threshold $\gamma s$ set in advance, a decision is made that the combustion is normal and then the situation of the procedure goes to the step of detecting angular acceleration at the next detection angle. When, on the contrary, the ratio $\alpha/\alpha'$ of angular acceleration is smaller than the threshold $\gamma s$, a decision is made that the combustion is abnormal and then the situation of the procedure goes to the step of controlling torque in the engine 1.

In the following, the flow chart shown in FIG. 15 in explained. In the step 151, a judgment is made as to whether the crank angle sensor 5 has generated a TDC pulse. When the TDC pulse is generated, divided pulses from the crank angle sensor 5 are counted in the step 152. In the step 153, a judgment is made as to whether the count value of the divided pulses coincides with the predetermined angular acceleration detection position (crank angle). When the count value coincides with the predetermined angular acceleration detection position, in the step 154, the angular acceleration $\alpha$ of the crankshaft is calculated on the basis of the divided pulses by the aforementioned method. In the step 155, the ratio of angular acceleration $\alpha$ calculated at the present time to angular acceleration $\alpha'$ calculated at the previous detection time and stored in a memory is calculated and is compared with the ratio threshold $\gamma s$ set in advance. When the angular acceleration ratio $\alpha/\alpha'$ is smaller than the ratio threshold $\gamma s$, a decision is made that abnormal combustion occurs because generated torque is reduced. When abnormal combustion is detected, in the step 156, the field current in the electric generator 4 is controlled to thereby suppress vibration. The field current control in the step 156 will be described in detail later.

In the case where more exact detection is required with respect to the degree of abnormal combustion, a detecting logic 157 in which the size of the ratio threshold $\gamma s$ is changed correspondingly to the operating condition of the internal combustion engine 1 such as load imposed on the internal combustion engine 1, engine speed, coolant temperature, etc. may be added.

In the detecting logics respectively shown in FIGS. 13 and 15, the previous value $\alpha'$ of angular acceleration at the previous detection angle is used as a subject of comparison with the present value $\alpha$ of angular acceleration. In the ordinary case, abnormal combustion can be detected sufficiently by these detecting logics. In the case where an error occurs between the detected value of angular acceleration and the real value thereof because of somewhat disturbance, however, not only the present value α of angular acceleration contains the error component but the previous value α' of angular acceleration at the previous detection angle as a subject of comparison contains the error component. Therefore, though the error contained in the value of angular acceleration detected at one times may be small, accumulated errors are contained in the difference α'−α or the ratio α/α' used for the judgment of abnormal combustion. Accordingly, misdetection of abnormal combustion will be made easily. To detect abnormal combustion securely, it is necessary to reduce the accumulation of errors contained in the detection of angular acceleration. For example, accuracy in production of the crank angle sensor, torsional vibration of a power drive train for transmitting the rotation of the crankshaft to the crank angle sensor, etc. are considered as large disturbance factors which produce an error between the detected value of angular acceleration and the real value thereof.

Therefore, in the following embodiment, a method not using the value α' of angular acceleration at the previous detection angle but using the average of angular acceleration at a plurality of detection angles in the past as a subject of comparison with the present value α of angular acceleration is employed for the purpose of reducing the accumulation of errors contained in the detection of angular acceleration. This averaging method is substantially equivalent to a method of passing the detected value of angular acceleration through a low-pass filter to thereby remove the change component caused by disturbance.

Figure 16:
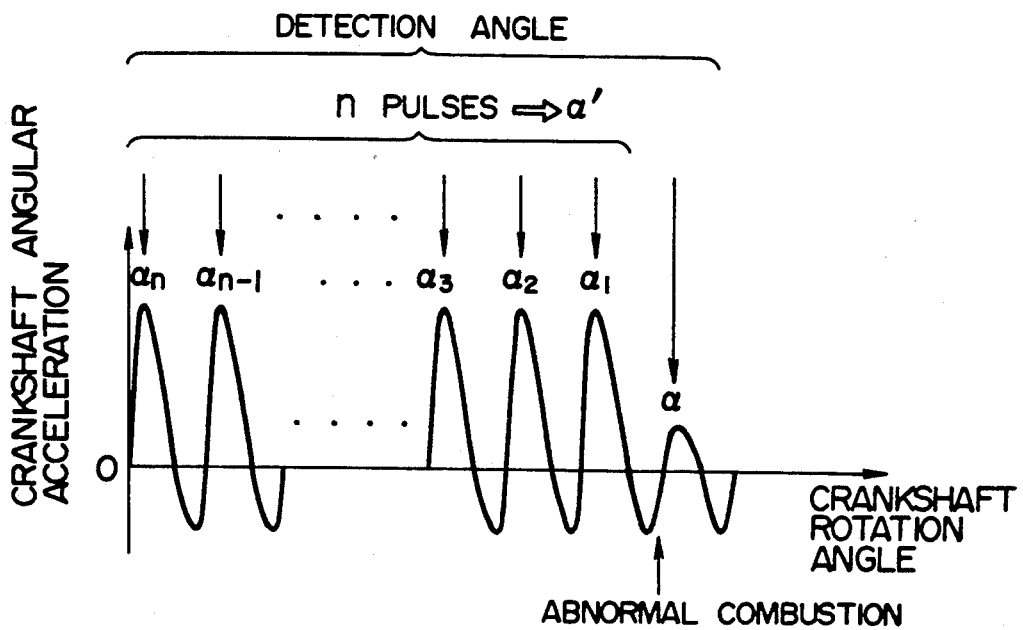
FIG. 16 is a graph for explaining the averaging of angular acceleration.

The moving average α' of weighed angular acceleration at n detection angles in the past is expressed by the following equation (see FIG. 16).

$$\alpha' = \sum_{i=1}^{n} A_i \times \alpha_i$$

The averaging procedure can be carried out by using a linear non-recursive digital filter composed of multipliers $A_1 \ldots A_n$, a delay element T and an adder Σ as shown in FIG. 17. Here, $A_1$ represents a weighting coefficient. If the equations $$A_1 = A_2 = \ldots = A_n = 1/n$$

are valid, the aforementioned equation is an equation for calculating a simple average.

The value of the weighting coefficient can be set to an optimum value under the consideration of the frequency in generation of abnormal combustion, the response characteristic of angular acceleration in the engine, etc. For example, in the case where the frequency in generation of abnormal combustion is high or in the case where the response characteristic of angular acceleration in the engine is high, or in other words, in the case where the average is greatly influenced by time, the weighting coefficient is set to a larger value as the point of detection time approaches the present time (the subscript in FIG. 16 and in the aforementioned equation approaches n).

Of course, the moving average α' of weighted angular acceleration can be calculated directly by processing of a microcomputer or the like.

Further, there is the possibility that some value of angular acceleration during the occurrence of abnormal combustion may be contained in the values of angular acceleration used for calculation of the moving average weighted at n detection angles in the past if the frequency in generation of abnormal combustion is high. In this case, it cannot be always said that the weighted moving average α' calculated according to the aforementioned equation reflects angular acceleration at the time of normal combustion. In this case, the calculated value α' can be made to reflect angular acceleration at the time of normal combustion exactly if the moving average of weighted angular acceleration is calculated from n values after some values of angular acceleration at the time of abnormal combustion are completely removed so as not to be used for calculation of the weighted moving average through the judgment of abnormal combustion in the judgment portion 7.

Although the aforementioned method is a method employed for the purpose of reducing the accumulation of errors contained in the detection of angular acceleration, a method for directly reducing errors contained in the detection of angular acceleration will be described hereunder.

As described above, torsional vibration of a power drive mechanism for transmitting the rotation of the crankshaft to the crank angle sensor is one of large disturbance factors which produce an error between the detected value of angular acceleration and the real value thereof. In general, in the crank angle sensor including a camshaft, the rotation of the crankshaft is transmitted to the camshaft through a belt or a chain. In the crank angle sensor including a distributor, the rotation of the crankshaft is transmitted to the distributor through a rotational shaft. The aforementioned torsional vibration is exhibited remarkably because these power drive mechanisms are small in torsional stiffness.

Figure 18:
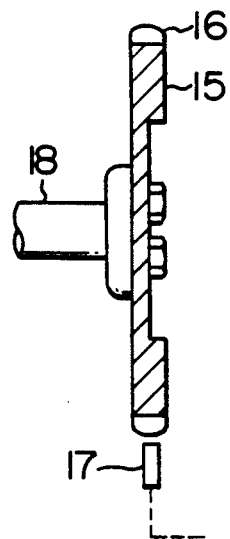
FIG. 18 is a diagram showing an example of configuration of a divided pulse generator used instead of the crank angle sensor.
Figure 19:
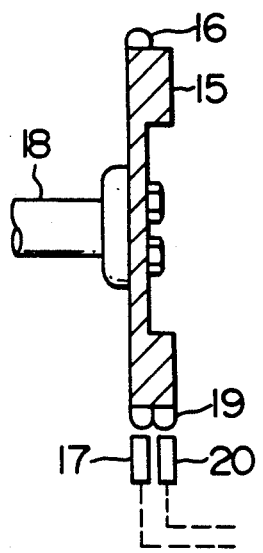
FIG. 19 is a diagram showing another example of construction of the divided pulse generator used instead of the crank angle sensor.

FIG. 18 is a diagram showing an example of construction of a divided pulse generator used instead of the crank angle sensor 5. This divided pulse generator is composed of a ring gear 16 around a flywheel 15 in the internal combustion engine, and an electromagnetic pickup 17 provided through a gap so as to be opposite to the ring gear 16. A tooth-like voltage waveform outputted from the electromagnetic pickup 17 whenever a tooth of the ring gear 16 passes through the front of the electromagnetic pickup 17 is used as a divided pulse. Because the flywheel 15 is directly attached to the crankshaft 18, the torsional stiffness thereof is larger than the torsional stiffness of the aforementioned power drive mechanisms so that the influence of torsional vibration little appears as an error in the detection of angular acceleration. Flywheel 15 with ring gear 16 is necessarily provided to the engine because a starter (not shown) cranks up engine 1 via the ring gear. Accordingly, the present invention only requires the electromagnetic pickup 17 newly.

This pulse generator can output only the divided pulses. Therefore, the TDC pulse from the crank angle sensor 5 is used for the purpose of determining the angle for detection of angular acceleration α. Although the TDC pulse outputted from the crank angle sensor 5 is influenced by torsional vibration, the TDC pulse is not directly used for detection of angular acceleration but is used only for calculation of the rotation angle of the crankshaft used for detection of angular acceleration. Accordingly, there is no specific problem when the pulse outputted from the crank angle sensor 5 is used as the TDC pulse. Of course, n the case where the angle for detection of angular acceleration is to be determined more exactly, a TDC pulse generation gear 19 and an electromagnetic pickup 20 may be provided in the outside of the flywheel 15 in addition to the conventional ring gear 16.

The process for detecting the angular acceleration of the crankshaft and detecting the occurrence of abnormal combustion by using the divided pulse and the TDC pulse can be carried out in the same manner as described above.

Figure 20:
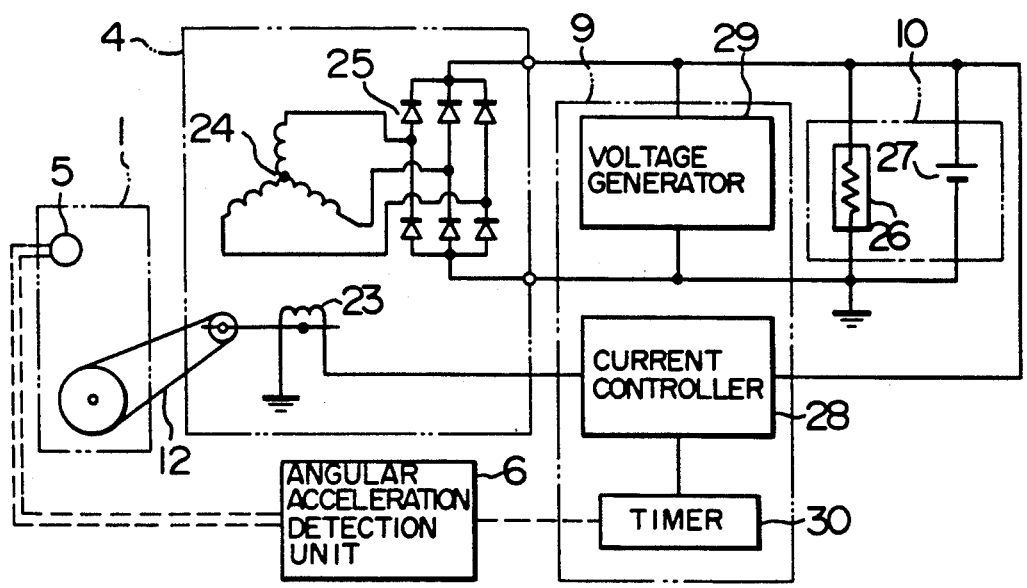
FIG. 20 is a diagram of a vibration control circuit.

FIG. 20 is a diagram showing the vibration control portion 9 for controlling the magnitude of the field current in the electric generator 4, and its vicinity in the outline of FIG. 1. The electric generator 4 is composed of a field coil 23 rotated by the output shaft of engine 1 through the belt 12 to thereby generate a rotational magnetic field, a stationary armature coil 24 for exciting three-phase alternating-current electromotive power from the change of field intensity produced by the rotation of the field, and a commutator 25 for converting the three-phase alternating-current electromotive power into direct-current power. For example, the commutator 25 is composed of a group of diodes. Electric load 10, such as an electric resistor 26 consuming the power generated from the electric generator 4, a battery 27 for reserving the generated power, etc., is connected to the output terminal of the commutator 25. The control unit 9 is composed of a current controller 28 for controlling the magnitude of the current supplied from the battery 27 to the field coil 23, a voltage regulator 29 provided between the electric generator 4 and the electric load 10, and a timer 30 for measuring the time passed after the occurrence of abnormal combustion detected by the angular acceleration detection portion 6. The power generated by the electric generator 4 changes correspondingly to the change of the intensity of the rotational field generated by the field coil 23, that is, correspondingly to the change of the current flowing in the field coil 23. As described above, the magnitude of vibration torque in the electric generator 4 changes correspondingly to the magnitude of the field current pulse. Accordingly, vibration torque can be increased by increasing the value of the current pulse flowing in the field coil 23 through the current controller 28 in the control unit 9. On the contrary, vibration torque can be decreased by decreasing the value of the current pulse flowing in the field coil 23. The voltage regulator 29 in the control unit 9 is a device for keeping the value of the voltage applied to the electric load 10 constant. Assuming now that the current flowing in the field coil 23 is increased for the purpose of generating vibration torque in the electric generator, then the intensity of the rotational field generated from the field coil 23 is increased so that the induced voltage excited in the armature coil 24 and the voltage at the output terminal of the commutator 25 imposed on the electric load 10 are increased. The voltage regulator 29 has a function for preventing the change of such applied voltages. It is a matter of course that there is no necessity of providing the voltage regulator 29 in the case where the electric load 10 is of the type permitting the change of the applied voltages.

Figure 21:
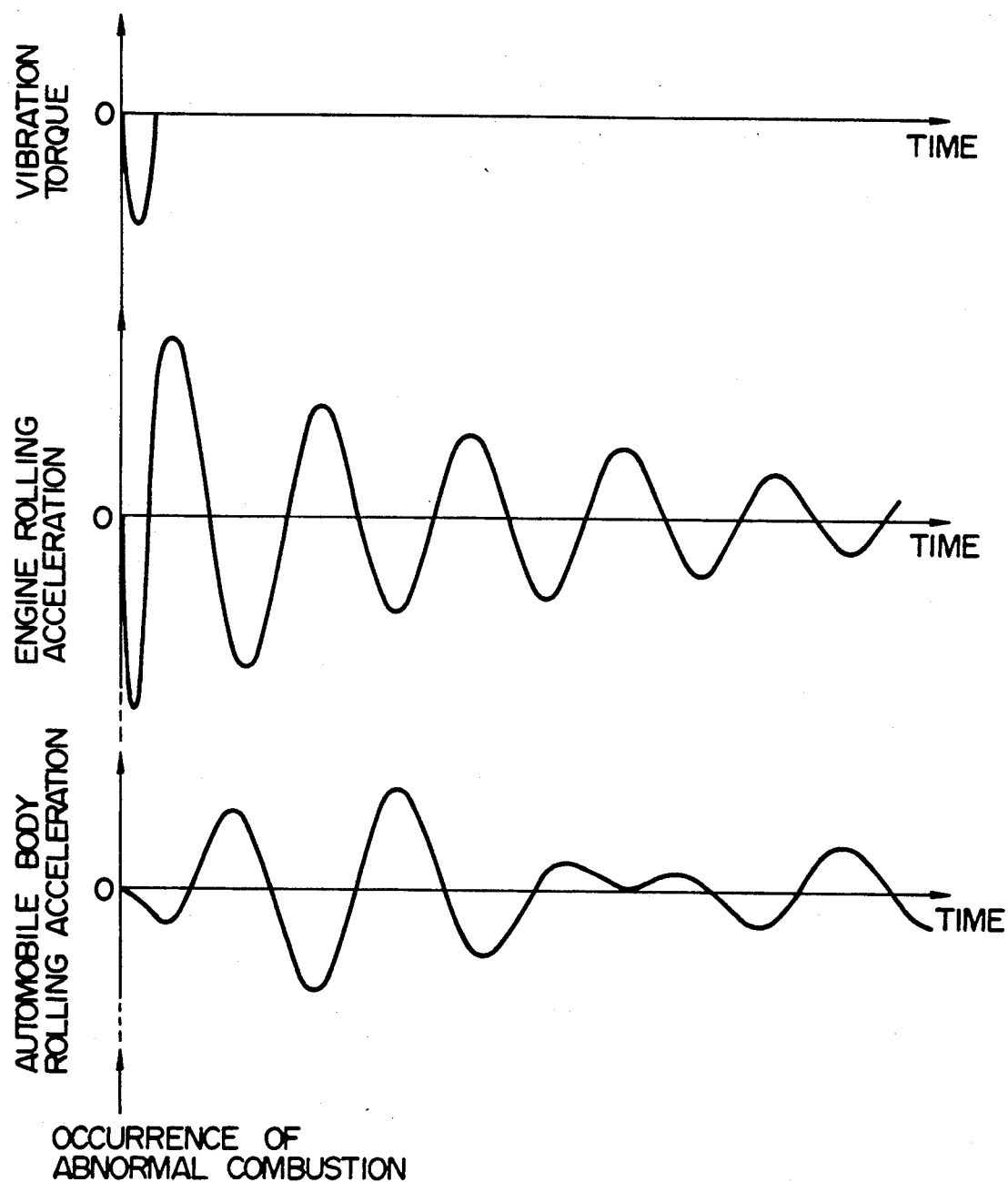
FIG. 21 is a series of graphs showing an example of the waveform of vibration torque caused by abnormal combustion and the waveforms of rolling of the internal combustion engine and the automobile.
Figure 22:
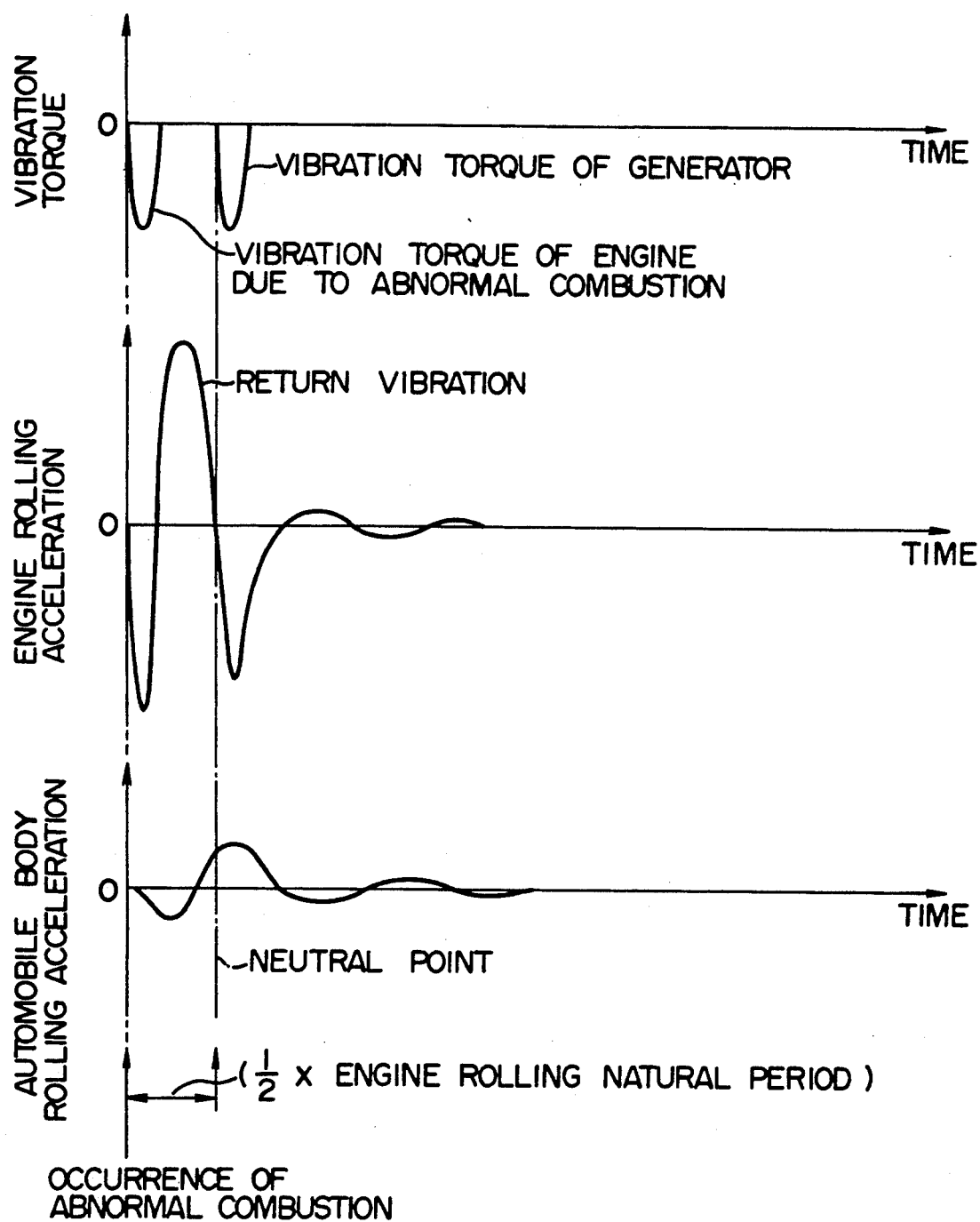
FIG. 22 is a series of graphs showing the waveform of torque and the waveforms of rolling in the case where vibration control is applied to abnormal combustion.

FIG. 21 is a series of graphs showing an example of the waveform (like a single-shot pulse) of vibration torque acting on the engine 1 due to abnormal combustion, and the response waveforms of rolling acceleration of the engine 1 and the automobile 3 caused by the vibration torque. FIG. 22 is a series of graphs showing the waveform of vibration torque in the case where the vibration torque in the engine 1 is controlled to be generated in the form of a single-shot pulse when time is passed by half the natural period of the rolling of the engine 1 after the generation of vibration torque caused by abnormal combussion, and the response waveforms of rolling acceleration of the engine 1 and the body of automobile 3 in this case.

As is obvious from the comparison between the case of no vibration control in FIG. 21 and the case of vibration control in FIG. 22, if the vibration torque in the internal combustion engine 1 is controlled to be generated in the form of a single-shot pulse when time is passed by half the natural period of the rolling of the engine 1 after the generation of vibration torque caused by abnormal combustion, the rolling of the engine caused by abnormal combustion and the rolling transmitted to the engine 1 by the vibration torque are canceled to each other so that not only the rolling of the engine 1 but the rolling of the automobile 3 including the engine 1 can be reduced rapidly.

Accordingly, if the control portion 9 controls the field current in the electric generator 4 to enlarge the field current like a single-shot pulse through the current regulator 28 when the timer 30 in the control portion 9 measures the passage of time of half the natural period of the rolling of the engine 1 after the occurrence of abnormal combustion, the rolling of the engine 1 and the rolling of the automobile 3 can be reduced so rapidly as described above that the feeling of passengers can be improved.

Figure 23:
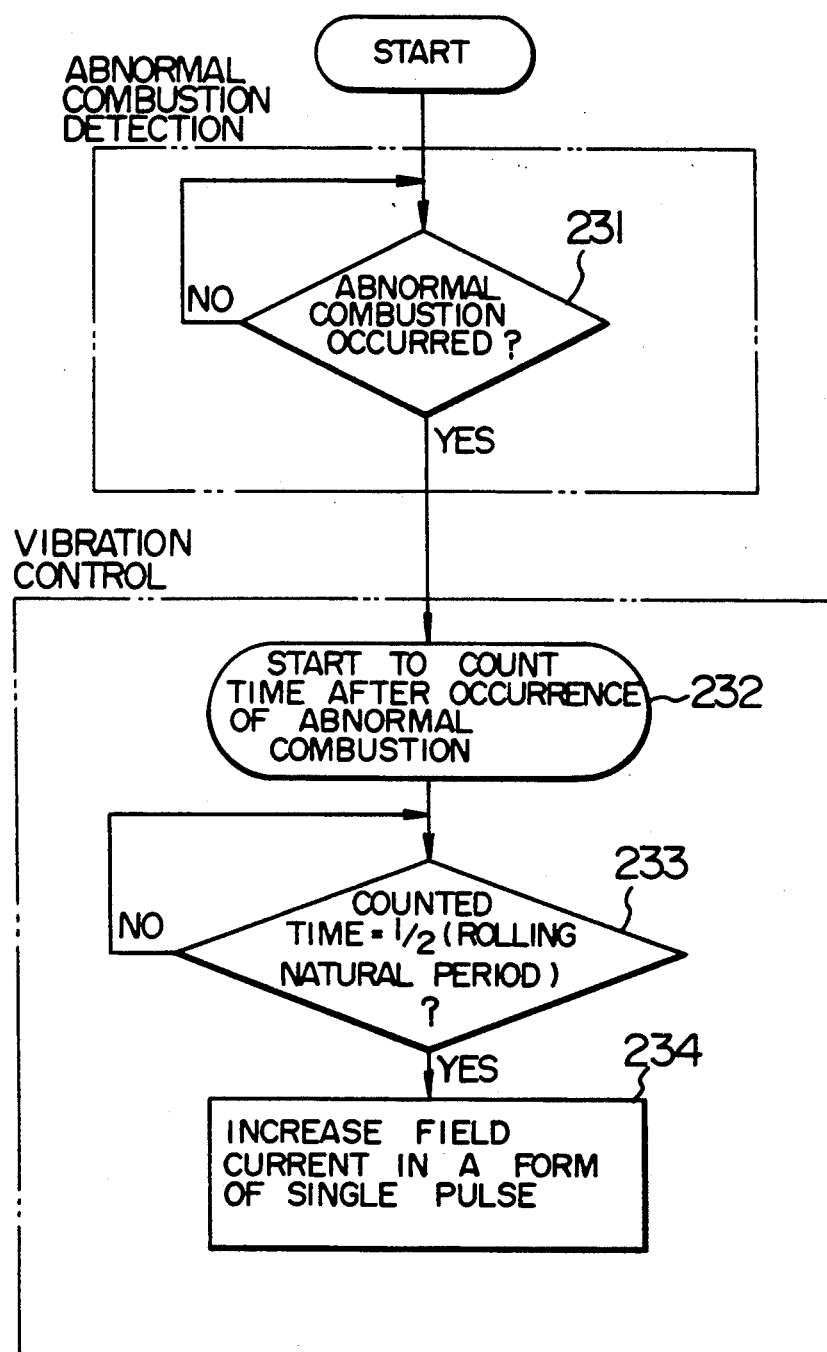
FIG. 23 is a flow chart of the vibration control depicted in FIG. 22.

FIG. 23 is a flow chart showing more in detail the steps 96, 116, 136 and 156 of controlling the field current in the electric generator 4 to thereby control vibration.

In the step 231, the occurrence of abnormal combustion is detected. This step is as described above with reference to FIGS. 9, 11, 13 and 15. Then, in the step 232, the time passed after the detection of abnormal combustion is counted by the timer. If the count time reaches half the natural period of the rolling of the engine 1 in the step 233, a pulse current is passed through the field coil 23 in the electric generator 4 to generate vibration torque in the electric generator body in the step 234.

In the apparatus for detecting abnormal combustion in the internal combustion engine according to the present invention, abnormal combustion in the engine can be exactly detected on the basis of the angular acceleration of the output shaft of the engine. In the apparatus for controlling vibration of the internal combustion engine according to the present invention, not only the vibration of the engine caused by the torque fluctuation due to abnormal combustion in the engine but the vibration of the automobile body including the engine can be canceled or reduced by reverse-phase vibration excited by vibration torque in the rotation machine.

What is claimed is:

1. An apparatus for detecting abnormal combustion in an internal combustion engine, comprising:
   means for detecting the rotation of the internal combustion engine;
   means for calculating rotation angular acceleration on the basis of the detected rotation;
   means for comparing the rotation angular acceleration at the position of a predetermined crank angle in one cycle of the operation of the internal combustion engine with a predetermined reference value; and means for judging from the comparison result in the comparing means whether or not abnormal combustion occurs in the internal combustion engine.

2. An apparatus according to claim 1, in which said rotation detecting means includes means for generating rotation angle pulses synchronous with the rotation of a rotation shaft of the internal combustion engine, and in which said rotation angular acceleration calculating means includes means for calculating the angular acceleration of the rotation shaft by differentiating the reciprocal of the pulse cycle of the rotation angle pulses with respect to time.

3. An apparatus according to claim 1, in which said rotation detecting means includes means for generating rotation angle pulses synchronous with the rotation of a rotation shaft of the internal combustion engine, and in which said rotation angular acceleration calculating means includes means for calculating the angular acceleration of the rotation shaft on the basis of the difference between the reciprocals of the pulse cycles of the rotation angle pulses at different points of time.

4. An apparatus according to claim 3, in which said rotation angle pulse generating means includes an angle sensor for generating the rotation angle pulses on the basis of the rotation of a cam shaft of the internal combustion engine.

5. An apparatus according to claim 3, in which said rotation angle pulse generating means includes an electromagnetic pickup arranged opposite to the teeth of a ring gear of a flywheel of the internal combustion engine and for generating a pulse whenever each of the teeth passes.

6. An apparatus according to claim 1, wherein said internal combustion engine includes a four-cycle engine, in which said rotation angular acceleration calculating means calculates angular acceleration for each crank angle of $720°/n$ (n representing the number of cylinders),and in which said judging means judges whether or not abnormal combustion occurs for each crank angle.

7. An apparatus according to claim 6, in which said rotation angular acceleration calculating means calculates angular acceleration whenever any one of the cylinders substantially reaches a top dead center, and in which said judging means makes a decision that abnormal combustion is present, when the value of rotation angular acceleration at said top dead center is negative with respect to said reference value as zero.

8. An apparatus according to claim 1, wherein said internal combustion engine includes a two-cycle engine, in which said rotation angular acceleration calculating means calculates angular acceleration for each crank angle of $360°/n$ (n representing the number of cylinders), and in which said judging means judges whether or not abnormal combustion occurs for each crank angle.

9. Apparatus for reducing vibration in an internal combustion engine by detecting and compensating for abnormal combustion in the internal combustion engine comprising said apparatus recited in claim 1 and further comprising:

a field excitation means for generating vibration torque in an electric generator by passing a pulse-like field current in the electric generator when abnormal combustion is detected by judging means.

10. A method of detecting abnormal combustion in an internal combustion engine, comprising the steps of:

detecting the rotation of the internal combustion engine;

calculating rotation angular acceleration on the basis of the detected rotation;

comparing the rotation angular acceleration at the position of a predetermined crank angle in one cycle of the operation of the internal combustion engine with a predetermined reference value; and judging from the comparison result whether or not abnormal combustion occurs in the internal combustion engine;

said judging step makes a decision that abnormal combustion is present, when said comparing step gives a result that the calculated value of rotation angular acceleration is smaller than said reference value.

11. An apparatus for detecting abnormal combustion in an internal combustion engine, comprising:

means for detecting the rotation of the internal combustion engine;

means for calculating rotation angular acceleration on the basis of the detected rotation;

means for comparing the rotation angular acceleration at the position of a predetermined crank angle in one cycle of the operation of the internal combustion engine with a predetermined reference value; and means for judging from the comparison result in the comparing means whether or not abnormal combustion occurs in the internal combustion engine;

said internal combustion engine includes a four-cycle engine, in which said rotation angular acceleration calculating means calculates angular acceleration for each crank angle of $720°/n$ (n representing the number of cylinders), and in which said judging means judges whether or not abnormal combustion occurs for each crank angle;

said rotation angular acceleration calculating means calculates angular acceleration for each crank angle and calculates the difference $(\alpha' - \alpha)$ between the calculated values of angular acceleration at two adjacent points of time, in which said comparing means compares the difference between the calculated values with the reference value, and in which said judging means makes a decision that abnormal combustion is present, when the difference between the calculated values in larger than the reference value.

12. An apparatus for detecting abnormal combustion in an internal combustion engine, comprising:

means for detecting the rotation of the internal combustion engine;

means for calculating rotation angular acceleration on the basis of the detected rotation;

means for comparing the rotation angular acceleration at the position of a predetermined crank angle in one cycle of the operation of the internal combustion engine with a predetermined reference value; and means for judging from the comparison result in the comparing means whether or not abnormal combustion occurs in the internal combustion engine;

said internal combustion engine includes a four-cycle engine, in which said rotation angular acceleration calculating means calculates angular acceleration for each crank angle of $720°/n$ (n representing the number of cylinders), and in which said judging means judges whether or not abnormal combustion occurs for each crank angle;

said rotation angular acceleration calculating means calculates angular acceleration for each crank angle and calculates the ratio ($\alpha/\alpha'$) of the calculates values of angle acceleration at two adjacent points of time, in which said comparing means compares the ratio of the calculates values with the reference value, and said judging means makes a decision that abnormal combustion is present when the ratio of the calculated values is larger than the reference value.

13. An apparatus for detecting abnormal combustion in an internal combustion engine, comprising:
   means for detecting the rotation of the internal combustion engine;
   means for calculating rotation angular acceleration on the basis of the detected rotation;
   means for comparing the rotation angular acceleration at the position of a predetermined crank angle in one cycle of the operation of the internal combustion engine with a predetermined reference value; and
   means for judging from the comparison result in the comparing means whether or not abnormal combustion occurs in the internal combustion engine;
   said internal combustion engine includes a four-cycle engine, in which said rotation angular acceleration calculating means calculates angular acceleration for each crank angle of 720°/n (n representing the number of cylinders), and in which said judging means judges whether or not abnormal combustion occurs for each crank angle;
   said rotation angular acceleration calculating means calculates angular acceleration for each crank angle, calculates the average of the calculated values of angular acceleration at a plurality of points of time in the past and calculates the difference between the average in the past and the calculated value of angular acceleration at the present time, in which said comparing means compares the difference between the average in the past and the calculated value at the present item with the reference value, and in which said judging means makes a decision that abnormal combustion is present, when the difference is larger than the reference value.

14. An apparatus according to claim 13, in which said rotation angular acceleration calculated means calculates the average of values obtained by adding predetermined weighing coefficients respectively to the calculated values of angular acceleration at the plurality of points of time.

15. An apparatus according to claim 14, in which said rotation angular acceleration calculating means calculates the average of the calculates values of angular acceleration at the plurality of points of time after all calculated values of angular acceleration smaller than a predetermined values are excluded from the calculation of the average.

16. An apparatus for detecting abnormal combustion in an internal combustion engine, comprising:
   means for detecting the rotation of the internal combustion engine;
   means for calculating rotation angular acceleration on the basis of the detected rotation;
   means for comparing the rotation angular acceleration at the position of a predetermined crank angle in one cycle of the operation of the internal combustion engine with a predetermined reference value; and
   means for judging from the comparison result in the comparing means whether or not abnormal combustion occurs in the internal combustion engine;
   said internal combustion engine includes a four-cycle engine, in which said rotation angular acceleration calculating means calculates angular acceleration for each crank angle of 720°/n (n representing the number of cylinders), and in which said judging means judges whether or not abnormal combustion occurs for each crank angle;
   said rotation angular acceleration calculating means calculates angular acceleration for each crank angle, calculates the average of the calculated values of angular acceleration at a plurality of points of time in the past and calculates the ratio of the average in the past to the calculated value of angular acceleration at the present time, in which said comparing means compares the ratio of the average in the past to the calculated value at the present time with the reference value, and in which said judging means makes a decision that abnormal combustion is present, when the ratio is larger than the reference value.

17. An apparatus according to claim 16, in which said rotation angular acceleration calculating means calculates the average of values obtained by adding predetermined weighing coefficients respectively to the calculated values of angular acceleration at the plurality of points of time.

18. An apparatus according to claim 16, in which said rotation angular acceleration calculating means calculates the average of the calculated values of angular acceleration at the plurality of points of time after all calculated values of angular acceleration smaller than a predetermined value are excluded from the calculation of the average.

19. An apparatus for reducing vibration in an internal combustion engine, comprising:
   an electric generator fixed to a part of the internal combustion engine;
   means for detecting the rotation of the internal combustion engine;
   means for calculating rotation angular acceleration on the basis of the detected rotation;
   means for comparing the rotation angular acceleration at the position of a predetermined crank angle in one cycle of the operation of the internal combustion engine;
   means for judging from the comparison result of said comparing means whether abnormal combustion occurs in the internal combustion engine; and
   a field excitation means for generating vibration torque in the electric generator by passing a pulse-like field current in the electric generator when abnormal combustion is detected by said judging means.

20. An apparatus according to claim 19, in which said field excitation means has a timer means for counting the passage of time of half the natural period of rolling of the internal combustion engine from the point of time when abnormal combustion is detected by said judging means, by which said pulse-like filed current is given to said electric generator when the counting operation of said timer means is completed.

21. A method of detecting abnormal combustion in an internal combustion engine, comprising the steps of:
   detecting the rotation of the internal combustion engine;
   calculating rotation angular acceleration on the basis of the detected rotation;
   comparing the rotation angular acceleration at the position of a predetermined crank angle in one cycle of the operation of the internal combustion engine with a predetermined reference value; and
   judging from the comparison result whether or not abnormal combustion occurs in the internal combustion engine.

22. A method according to claim 21, in which said rotation detecting step includes the step of counting rotation angle pulses synchronous with the rotation of a rotation shaft of the internal combustion engine, and in which said rotation angular acceleration calculating step includes the step of calculating the angular acceleration of the rotation shaft by differentiating the reciprocal of the pulse period of the rotation angle pulses with respect to time.

23. A method according to claim 21, in which said rotation detecting step includes the step of counting rotation angle pulses synchronous with the rotation of a rotation shaft of the internal combustion engine, and in which said rotation angular acceleration calculating step includes the step of calculating the angular acceleration of the rotation shaft on the basis of the difference between the reciprocals of the pulse cycles of the rotation angle pulses at different points of time.

24. A method according to claim 21, in which said rotation angular acceleration calculating step calculates angular acceleration whenever any one of the cylinders substantially reaches a top dead center, and in which said judging step makes a decision that abnormal combustion is present, when the value of rotation angular acceleration at said top dead center is negative with respect to said reference value as zero.

25. A method according to claim 21, in which said rotation angular acceleration calculating step calculates angular acceleration for each crank angle, calculates the average of the calculated values of angular acceleration at a plurality of points of time in the past and calculates the difference between the average in the past and the calculated value of angular acceleration at the present time, in which said comparing step compares the difference between the average in the past and the calculated value at the present time with the reference value, and in which said judging step makes a decision that abnormal combustion is present, when the difference is larger than the reference value.

26. A method according to claim 25, in which said rotation angular acceleration calculating step calculates the average of values obtained by adding predetermined weighing coefficients respectively to the calculated values of angular acceleration at the plurality of points of time.

27. A method according to claim 21, in which said rotation angular acceleration calculating step calculates angular acceleration for each crank angle, calculates the average of the calculated values of angular acceleration at a plurality of points of time in the past and calculates the ratio of the average in the past to the calculated value of angular acceleration at the present time, in which said comparing step compares the ratio of the average in the past to the calculated value at the present time with the reference value, and in which said judging step makes a decision that abnormal combustion is present, when the ratio is larger than the reference value.

28. A method according to claim 27, in which said rotation angular acceleration calculating step calculates the average of values obtained by adding predetermined weighing coefficients respectively to the calculated values of angular acceleration at the plurality of points of time.

29. A method of reducing vibration in an internal combustion engine having an electric generator fixed to a part of the internal combustion engine by detecting and compensating for abnormal combustion in the internal combustion engine comprising the steps recited in claim 21 and further comprising the step of:
   passing a pulse-like field current in the electric generator so as to make the electric generator generate vibration torque when abnormal combustion is detected by said judging means.

30. A method of detecting abnormal combustion in an internal combustion engine, comprising the steps of:
   detecting the rotation of the internal combustion engine;
   calculating rotation angular acceleration on the basis of the detected rotation;
   comparing the rotation angular acceleration at the position of a predetermined crank angle in one cycle of the operation of the internal combustion engine with a predetermined reference value; and
   judging from the comparison result whether or not abnormal combustion occurs in the internal combustion engine;
   said rotation angular acceleration calculating step calculates angular acceleration for each crank angle and calculates the difference ($\alpha' - \alpha$) between the calculated values of angular acceleration at two adjacent points of time, in which said comparing step compares the difference between the calculated values with the reference value, and in which said judging step makes a decision that abnormal combustion is present, when the difference between the calculated values is larger than the reference value.

31. A method of detecting abnormal combustion in an internal combustion engine, comprising the steps of:
   detecting the rotation of the internal combustion engine;
   calculating rotation angular acceleration on the basis of the detected rotation;
   comparing the rotation angular acceleration at the position of a predetermined crank angle in one cycle of the operation of the internal combustion engine with a predetermined reference value; and
   judging from the comparison result whether or not abnormal combustion occurs in the internal combustion engine;
   said rotation angular acceleration calculating step calculates angular acceleration for each crank angle and calculates the ratio ($\alpha/\alpha'$) of the calculated values of angular acceleration at two adjacent points of time, in which said comparing step compares the ratio of the calculated values with the reference value, and in which said judging step makes a decision that abnormal combustion is present, when the ratio of the calculated values is larger than the reference value.

32. A method of detecting abnormal combustion in an internal combustion engine, comprising the steps of:
- detecting the rotation of the internal combustion engine;
- calculating rotation angular acceleration on the basis of the detected rotation;
- comparing the rotation angular acceleration at the position of a predetermined crank angle in one cycle of the operation of the internal combustion engine with a predetermined reference value; and
- judging from the comparison result whether or not abnormal combustion occurs in the internal combustion engine;
- said rotation angular acceleration calculating step calculates angular acceleration for each crank angle, calculates the average of the calculated values of angular acceleration at a plurality of points of time in the past and calculates the difference between the average in the past and the calculated value of angular acceleration at the present time, in which said comparing step compares the difference between the average in the past and the calculated value at the present time with the reference value, and in which said judging step makes a decision that abnormal combustion is present, when the difference is larger than the reference value;
- said rotation angular acceleration calculating step calculates the average of values obtained by adding predetermined weighing coefficients respectively to the calculated values of angular acceleration at the plurality of points of time;
- said rotation angular acceleration calculating step calculates the average of the calculated values of angular acceleration at the plurality of points of time after all calculated values of angular acceleration smaller than a predetermined value are excluded from the calculation of the average.

33. A method of detecting abnormal combustion in an internal combustion engine, comprising the steps of:
- detecting the rotation of the internal combustion engine;
- calculating rotation angular acceleration on the basis of the detected rotation;
- comparing the rotation angular acceleration at the position of a predetermined crank angle in one cycle of the operation of the internal combustion engine with a predetermined reference value; and
- judging from the comparison result whether or not abnormal combustion occurs in the internal combustion engine;
- said rotation angular acceleration calculating step calculates angular acceleration for each crank angle, calculates the average of the calculated values of angular acceleration at a plurality of points of time in the past and calculates the ratio of the average in the past to the calculated value of angular acceleration at the present time, in which said comparing step compares the ratio of the average in the past to the calculated value at the present time with the reference value, and in which said judging step makes a decision that abnormal combustion is present, when the ratio is larger than the reference value;
- said rotation angular acceleration calculating step calculates the average of values obtained by adding predetermined weighing coefficients respectively to the calculated values of angular acceleration at the plurality of points of time;
- said rotation angular acceleration calculating step calculates the average of the calculated values of angular acceleration at the plurality of points of time after all calculated values of angular acceleration smaller than a predetermined value are excluded from the calculation of the average.

34. A method of reducing vibration in an internal combustion engine having an electric generator fixed to a part of the internal combustion engine, comprising the steps of:
- detecting the rotation of the internal combustion engine;
- calculating rotation angular acceleration on the basis of the detected rotation;
- comparing the rotation angular acceleration at the position of a predetermined crank angle in one cycle of the operation of the internal combustion engine;
- judging from the comparison result whether or not abnormal combustion occurs in the internal combustion engine; and
- passing a pulse-like field current in the electric generator so as to make said electric generator generate vibration torque when abnormal combustion is detected by said judging means.

35. An apparatus for detecting abnormal combustion in an internal combustion engine, comprising:
- means for detecting the rotation of the internal combustion engine;
- means for calculating rotation angular acceleration the basis of the detected rotation;
- means for comparing the rotation angular acceleration at the position of a predetermined crank angle in one cycle of the operation of the internal combustion engine with a predetermined reference value; and
- means for judging from the comparison result in the comparing means whether or not abnormal combustion occurs in the internal combustion engine;
- said internal combustion engine includes a four-cycle engine, in which said rotation angular acceleration calculating means calculates angular acceleration for each crank angle of 720°/n (n representing the number of cylinders), and in which said judging means judges whether or not abnormal combustion occurs for each crank angle;
- said judging means makes a decision that abnormal combustion is present, when said comparing means gives a result that the calculated value of rotation angular acceleration is smaller than said reference value.

36. An apparatus for detecting abnormal combustion in an internal combustion engine, comprising:
- means for detecting the rotation of the internal combustion engine;
- means for calculating rotation angular acceleration on the basis of the detected rotation;
- means for comparing the rotation angular acceleration at the position of a predetermined crank angle in one cycle of the operation of the internal combustion engine with a predetermined reference value; and
- means for judging from the comparison result in the comparing means whether or not abnormal combustion occurs in the internal combustion engine;
- said rotation detecting means includes means for generating rotation angle pulses synchronous with the rotation of a rotation shaft of the internal combustion engine, and in which said rotation angular acceleration calculating means includes means for calculating the angular acceleration of the rotation shaft by differentiating the reciprocal of the pulse cycle of the rotation angle pulses with respect to time;

said angular acceleration calculating means includes a frequency/voltage conversion means for converting the frequency of the rotation angle pulses into a voltage value, and a differentiating circuit for differentiating the voltage value.

37. A method of reducing vibration in an internal combustion engine having an electric generator fixed to a part of the internal combustion engine, comprising the steps of:

detecting the rotation of the internal combustion engine;

calculating rotation angular acceleration on the basis of the detected rotation;

comparing the rotation angular acceleration at the position of a predetermined crank angle in one cycle of the operation of the internal combustion engine;

judging from the comparison result whether or not abnormal combustion occurs in the internal combustion engine; and passing a pulse-like field current in the electric generator so as to make said electric generator generate vibration torque when abnormal combustion is detected by said judging means;

said field current passing step includes the step of counting the passage of time of half the natural period of rolling of the internal combustion engine from the point of time when abnormal combustion is detected, so that said pulse-like field current is given to said electric generator when the counting operation is completed.

* * * * *